(12) United States Patent
Itoh et al.

(10) Patent No.: US 7,359,649 B2
(45) Date of Patent: Apr. 15, 2008

(54) INFRARED TRANSMITTER CIRCUIT AND ELECTRONIC DEVICE

(75) Inventors: Hiroaki Itoh, Kashihara (JP); Naruichi Yokogawa, Kashihara (JP); Takeshi Nishino, Nara (JP); Ryosuke Kawashima, Katsuragi (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 579 days.

(21) Appl. No.: 10/968,884

(22) Filed: Oct. 21, 2004

(65) Prior Publication Data

US 2005/0089337 A1    Apr. 28, 2005

(30) Foreign Application Priority Data

Oct. 24, 2003  (JP) .............................. 2003-364938

(51) Int. Cl.
*H04B 10/04* (2006.01)
*H01S 3/00* (2006.01)

(52) U.S. Cl. ............... 398/182; 398/130; 372/29.014; 372/29.015; 372/38.01; 372/38.02; 372/38.07; 372/38.1

(58) Field of Classification Search ........... 372/29.014, 372/29.015, 38.07, 38.1, 38.02, 38.01; 398/182, 398/130

See application file for complete search history.

(56) References Cited

U.S. PATENT DOCUMENTS 6,538,394 B2 * 3/2003 Hurtz et al. ................ 315/291

2005/0063710 A1 * 3/2005 Ohsawa et al. ............. 398/182

FOREIGN PATENT DOCUMENTS

JP           58-50785 A      3/1983
WO    WO 03049328 A1 *      6/2003

* cited by examiner

*Primary Examiner*—Kenneth Vanderpuye
*Assistant Examiner*—Daniel G Dobson
(74) *Attorney, Agent, or Firm*—Birch, Stewart, Kolasch & Birch, LLP

(57) ABSTRACT

An infrared transmitter circuit causes an output current to flow to a light emission diode via a current mirror circuit constituted of three transistors by using a current supplied from a power source circuit, so that the light emission diode emits light. When a voltage V1 varied by charging a capacitor with a current flowing from the power source circuit exceeds a reference voltage (voltage V2), an output of a comparator resets a D flip-flop, so that an output of the D flip-flop varies to "0". Thus, an output of a NAND gate to which that output and a transmission signal are inputted causes a transistor (N-channel FET) to turn ON so as to stop operation of the current mirror circuit, and causes a transistor (P-channel FET) to turn OFF so as to cut a connection between the power source circuit and a power source line. Thus, it is possible to reduce power consumption in operation of a protection circuit which stops supplying the output current to the light emission diode.

18 Claims, 16 Drawing Sheets

FIG. 16 CONVENTIONAL ART
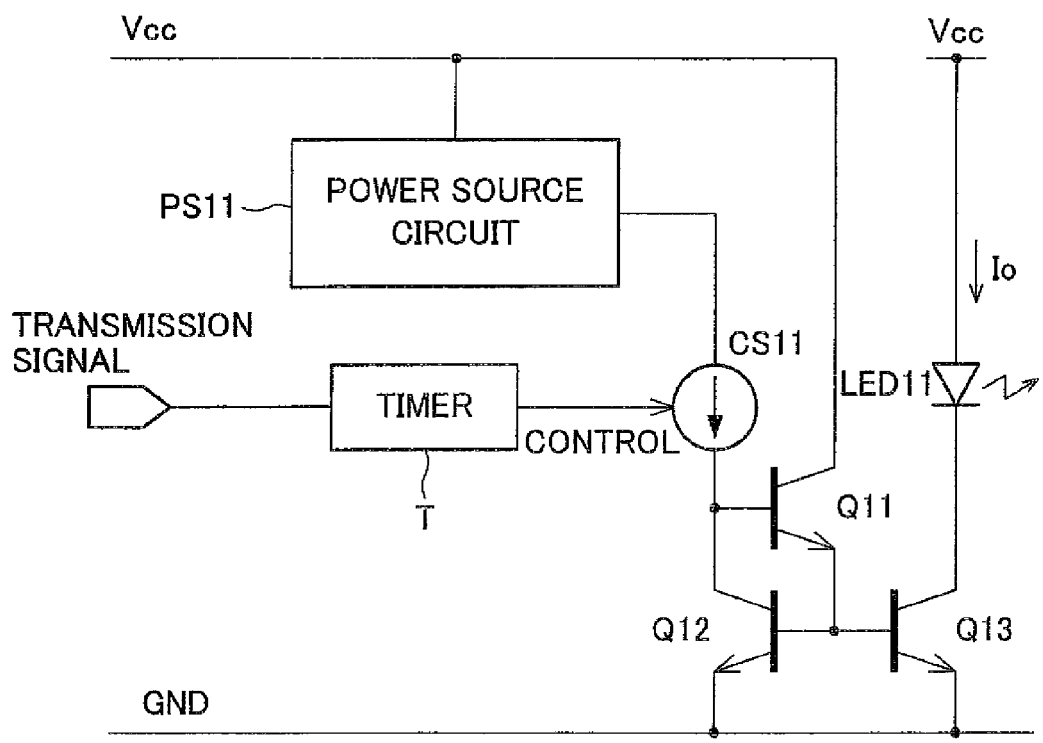
FIG. 17 CONVENTIONAL ART
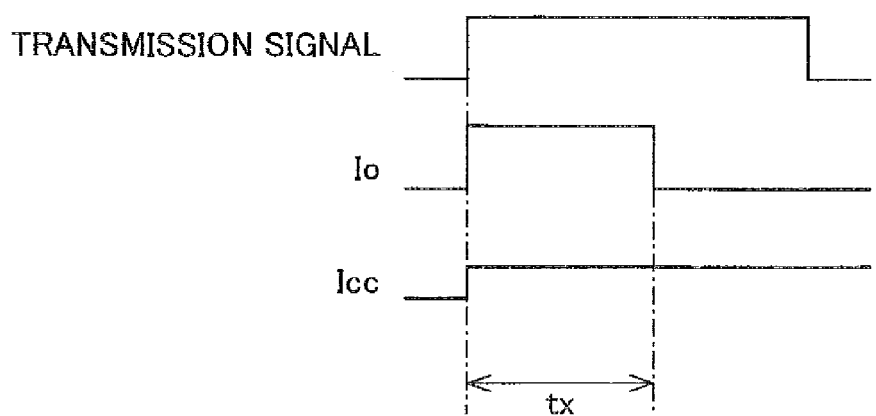

INFRARED TRANSMITTER CIRCUIT AND ELECTRONIC DEVICE

This Nonprovisional application claims priority under 35 U.S.C. § 119(a) on Patent Application No. 2003/364938 filed in Japan on Oct. 24, 2003, the entire contents of which are hereby incorporated by reference.

FIELD OF THE INVENTION

The present invention relates to a transmitter circuit used to perform infrared communications in which a protection circuit is used to prevent unnecessary lighting of a light emission element.

BACKGROUND OF THE INVENTION

Use of a digital signal wireless communication using an infrared ray has been diversified, for example, it is used typically in a remote controller and recently in a mobile device provided with a communication device which is in conformity to an IrDA standard. In the communications, it is general to use an infrared light emission diode to perform data communications.

The infrared light emission diode requires approximately 50 mA as a driving current in sequentially emit light. However, in optical communications, a current which is several times to approximately 10 times as much as the driving current is subjected to pulse driving so as to secure transmission optical intensity, thereby enabling telecommunications. As a result, the light emission diode is made to excessively emit light, so that the light emission diode is deteriorated or damaged. In case where input of a transmission signal is continued for a certain time or more which causes the light emission diode to emit light, the driving current is stopped from being supplied to the light emission diode, so that it is possible to prevent the light emission diode from being deteriorated or damaged. Such technique is known, and is described as follows. FIG. 16 shows an arrangement of the conventional infrared transmitter circuit.

As shown in FIG. 16, the conventional infrared transmitter circuit is arranged so that: when a power source circuit PS11 turns ON in response to input of a transmission signal, a current is supplied from the power source circuit PS11 to a constant current source CS11. Thus, when a current flows from the constant current source CS11 to a base of a transistor Q11, the transistor Q11 turns ON, so that the transmission signal flows to bases of transistors Q12 and Q13 via the transistor Q11. Therefore, the transistors Q12 and Q13 turn ON only at a time when a level of the transmission signal is high. The transistors Q11 to Q13 constitute a current mirror circuit, so that an output current Io, whose value is the same as that of a constant current flowing from the constant current source CS11 to the transistor Q12, flows from a power source of a voltage Vcc to the transistor Q13 via a light emission diode LED 11.

Further, as shown in FIG. 17, when a certain time tx passes after the transmission signal has been inputted (high level), a timer T causes the constant current source CS11 to stop. Thus, the transistor Q12 turns OFF, so that also the transistor Q13 turns OFF. As a result, the output current Io is stopped from being supplied to the light emission diode LED11.

An example of a document which recites such a technique that the light emission diode is protected on the basis of the foregoing time management is Japanese Unexamined Patent Publication No. 50785/1983 (Tokukaisho 58-50785)(Publication date: Mar. 25, 1983).

However, the circuit shown in FIG. 16 uses a high level of the transmission signal as a power source of the power source circuit PS11. Thus, as shown in FIG. 17, also after the output current Io of the light emission diode LED11 becomes 0 with the timer T indicating the certain time tx, the power source current Icc flows to the power source circuit SP11 until the transmission signal becomes "0", so that the current consumption does not become 0. As a result, in case where the infrared transmitter circuit is installed on a device, such as a mobile device, which operates on the basis of a battery, a time in which the device can be used is short.

For example, according to the aforementioned IrDA standard, it is necessary that the communication element can be connected directly to a serial port of a personal computer. The light emission diode which performs transmission under a high level condition emits light, but an output of the serial port of the personal computer is a high level when it is not controlled. Thus, when the serial port is not controlled by a computer, the serial port is under a condition that causes the light emission diode to emit light. However, in the foregoing circuit, the driving current is stopped from being supplied to the light emission diode LED11 after a certain time has passed, but a current always flows to the power source circuit SP11 in this while. Thus, in a battery-driven device such as a lap top personal computer or a mobile phone provided with the IrDA communication element, the power consumption increases, so that a time in which the device can operate is short.

SUMMARY OF THE INVENTION

The object of the present invention is to provide an infrared transmitter circuit which can reduce power consumption while a protection circuit for stopping supplying a driving current to a light emission diode is operating.

In order to achieve the foregoing object, the infrared transmitter circuit of the present invention includes: a light emission element; and a driving circuit which outputs a driving current, being constant, which causes the light emission element to emit light on the basis of a transmission signal constituted of a pulse, said driving circuit including: (a) a protection circuit for stopping supplying the driving current to the light emission element as a protection operation when the transmission signal is in a state which causes the light emission element to emit light for a certain time or more; and (b) a reference current source for generating a reference current so as to generate the driving current, wherein the protection circuit stops supplying the constant driving current and stops the reference current source.

The infrared transmitter circuit of the present invention includes the protection circuit for preventing the light emission element and the driving circuit from heating and deteriorating. The protection circuit not only stops supplying a driving current to the light emission element but also stops the reference current source, so that a current is hardly consumed by the reference current source. Thus, it is possible to use a battery-driven device provided with the infrared transmitter circuit for a longer period of time.

For a fuller understanding of the nature and advantages of the invention, reference should be made to the ensuing detailed description taken in conjunction with the accompanying drawings.

BRIEF DESCRIPTION OF THE DRAWINGS

FIG. 16 is a circuit diagram showing a conventional infrared transmitter circuit.

FIG. 17 is a waveform chart showing operation waveforms of the infrared transmitter circuit of FIG. 16.

DESCRIPTION OF THE EMBODIMENTS

Embodiment 1

Figure 1:
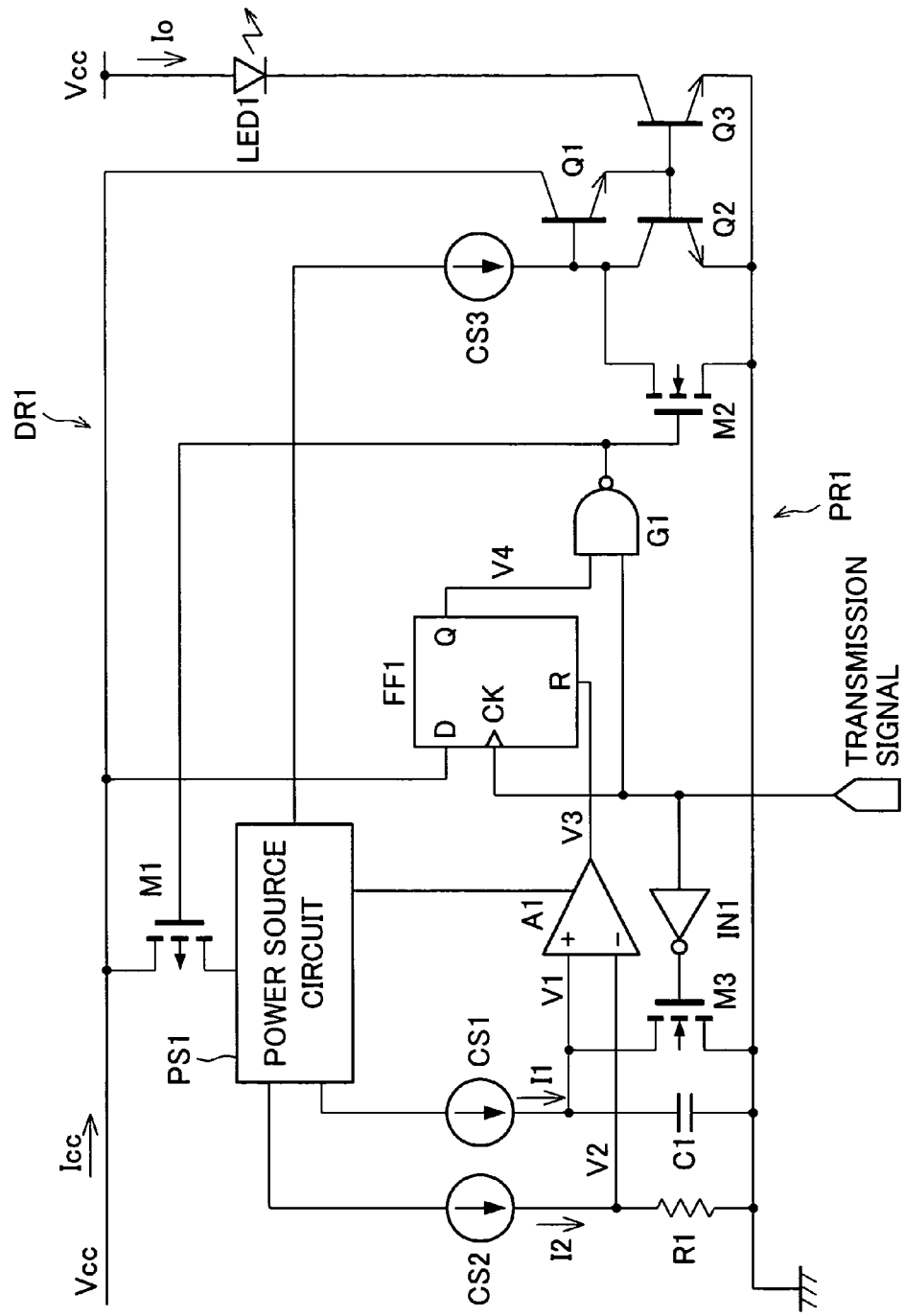
FIG. 1 is a circuit diagram showing an infrared transmitter circuit of Embodiment 1 of the present invention.
Figure 2:
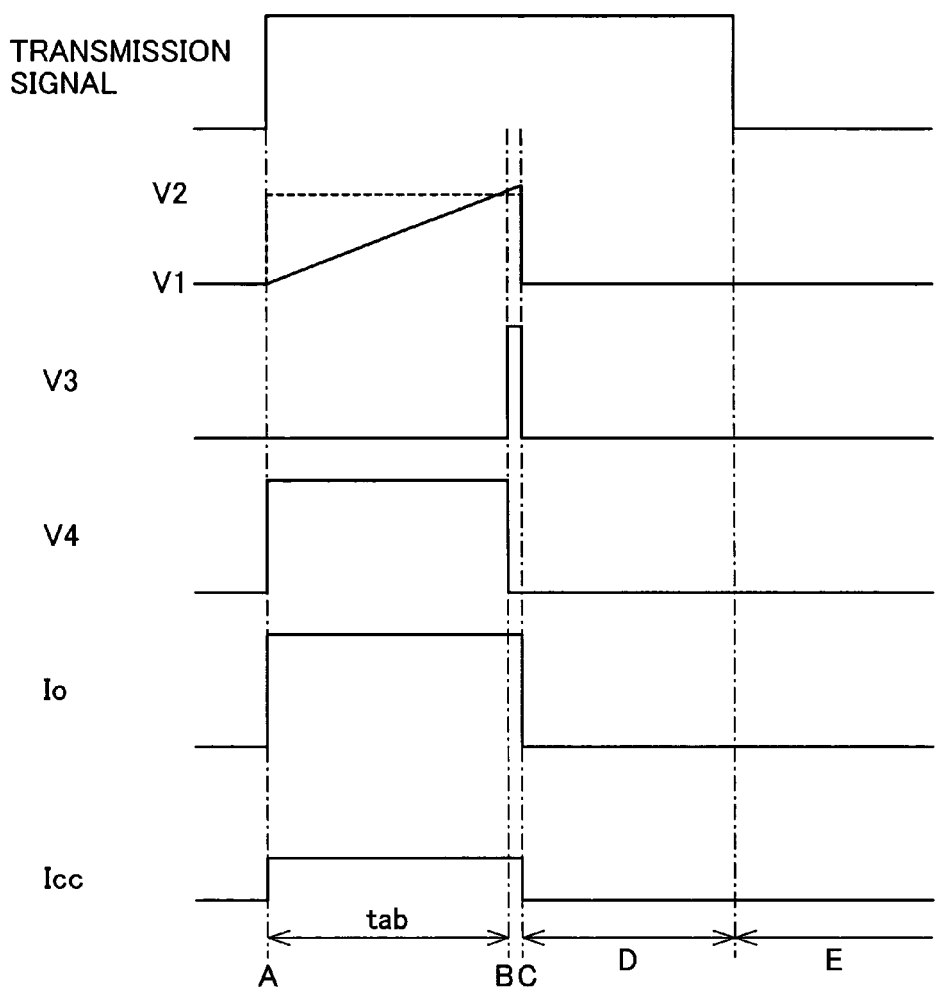
FIG. 2 is a waveform chart showing operation waveforms of the infrared transmitter circuit of FIG. 1.

The following description will explain one embodiment of the present invention with reference to FIG. 1 and FIG. 2.

FIG. 1 shows an arrangement on an infrared transmitter circuit according to the present embodiment. Further, FIG. 2 shows an operation timing of the infrared transmitter circuit.

As shown in FIG. 1, the infrared transmitter circuit includes a light emission diode LED1 which emits infrared ray as a light emission element. Further, as a driving circuit DR1, the infrared transmitter circuit includes a power source circuit PS1, transistors Q1 to Q3, transistors M1 to M3, constant current sources CS1 to CS3, a NAND gate G1, a D flip-flop FF1, a comparator A1, an inverter circuit IN1, a resistor R1, and a capacitor C1. Each of the infrared transmitter circuit of the present embodiment and infrared transmitter circuits of other embodiments described later is integrated and is provided in an infrared communication element.

In the infrared transmitter circuit, the transistors M1 to M3, the constant current sources CS1 and CS2, the NAND gate G1, the D flip-flop FF1, the comparator A1, the inverter circuit IN1, the resistor R1, and the capacitor C1 constitute a protection circuit for preventing unnecessary lighting of the light emission diode LED1.

The power source circuit PS1 is a circuit for supplying voltages and currents, which are required in operations, to the constant current sources CS1 to CS3 and the comparator A1. The power source circuit SP1 functions as a reference current source for supplying reference currents to constant current sources CS1 to CS3.

Between the power source circuit PS1 and a power source line to which a constant power source voltage Vcc is applied, there is provided the transistor M1 constituted of a P-channel FET (field effect transistor). The transistor M1 turns ON, so that the power source voltage Vcc and a power source current Icc are supplied from the power source line to the power source circuit PS1.

A collector of the NPN-type transistor Q2 is connected to the constant current source CS3 and a base of the NPN-type transistor Q1, and an emitter of the transistor Q2 is connected to a GND line (grounded). Bases of the transistors Q2 and Q3 are connected to each other, and are connected to an emitter of the transistor Q1. A collector of the transistor Q1 is connected to the power source line. A collector of the NPN-type transistor Q3 is connected to a cathode of the light emission diode LED1, and an emitter of the transistor Q3 is connected to the GND line. Further, a light emission element driving power source line which is provided on a system different from the power source line is connected to an anode of the light emission diode LED1.

The capacitor C1 is provided between the constant current source CS1 and the GND line, and the resistor R1 is provided between the constant current source CS2 and the GND line. A junction of the constant current source CS1 and the capacitor C1 is connected to a non-inversion input terminal of the comparator A1. Further, a junction of the constant current source CS2 and the resistor R1 is connected to an inversion input terminal of the comparator A1. An output terminal of the comparator A1 is connected to a reset terminal R of the D flip-flop FF1.

A transmission signal is inputted to a positive logic clock input terminal CK of the D flip-flop FF1. Further, the power source line is connected to a data input terminal D of the D flip-flop FF1, and an output terminal Q of the D flip-flop FF1 is connected to one of input terminals of the NAND gate G1. A transmission signal is inputted to the other of the input terminals of the NAND gate G1.

The transistor M3 constituted of an N-channel FET is provided parallel to the capacitor C1, and a transmission signal is inputted to a gate of the transistor M via the inverter circuit IN1.

An output terminal of the NAND gate G1 is connected to a gate of the transistor M1 and a gate of the transistor M2 constituted of an N-channel FET. The transistor M2 is provided in parallel to the transistor Q2.

As shown in FIG. 2, the infrared transmitter circuit arranged in the foregoing manner causes the light emission diode LED1 to emit light when the transmission signal is "1" (Vcc level: high level (active)), and causes the light emission diode LED1 stop emitting light when the transmission signal is "0" (GND level: low level (inactive)), thereby performing communications. First, the transmission signal varies from "0" to "1", so that also an output V4 of the D flip-flop FF1 varies from "0" to "1". As a result, an output of the NAND gate G1 becomes "0". Thus, the transistor M1 turns ON and the power source circuit PS1 turns ON, and the transistor M1 turns OFF, so that a collector-emitter line of the transistor Q2 is opened. Therefore, the constant current source CS3 can supply a current, and a current mirror circuit constituted of the transistors Q1 to Q3 operates. As a result, a constant output current Io which functions as a driving current based on a current flowing from the constant current source CS3 flows from the power source line to the light emission diode LED1, so that the light emission diode LED1 begins emitting light ("A" point of FIG. 2).

At this time, a voltage V1 obtained due to an output current I1 flowing from the constant current source CS1 rises with time, and a constant voltage V2 obtained due to an output current I2 flowing from the constant current source CS2 is supplied as a reference voltage of the comparator A1. Further, at a time when V1>V2 ("B" point of FIG. 2), an output V3 of the comparator A1 varies from "0" to "1". The output V3 is supplied to the reset terminal R of the D flip-flop FF1, so that an output V4 of the D flip-flop FF1 becomes "0", and an output of the NAND gate G1 varies from "0" to "1". Thus, the transistor M1 turns OFF, and the transistor M2 turns ON, so that the power source current Icc stops flowing to the power source circuit SP1. As a result, the power source circuit PS1 turns OFF, and the constant current source CS3 stops supplying a current to the transistor Q2. This causes the output current Io not to be supplied to the light emission diode LED1 (protection operation of the protection circuit).

The transistor M1 turns OFF and cuts off the power source of the power source circuit PS1, so that the power source of the comparator A1 is cut off. As a result, the output V3 becomes "0" again. However, the D flip-flop FF1 stores a reset condition, so that the output V4 is kept to be "0". Thus, even when the transmission signal remains "1", a condition under which the constant current source CS3 stops supplying a current and the output current Io is kept ("C" point of FIG. 2). Each of the D flip-flop FF1, the NAND gate G1, the inverter circuit IN1, and the transistors M1 to M3 is constituted of an FET, so that each of these members hardly consumes a current under a non-operation condition. Thus, it is possible to suppress the current consumption at the time of the protection operation ("D" section of FIG. 2) to substantially "0".

Incidentally, under such condition that the power source circuit PS1 stops, electric charge variation of the capacitor C1 which has been fully charged differs depending on conditions of output impedance of the constant current source CS1 and input impedance of the comparator A1, so that the voltage V1 is not necessarily "0". However, the power source of the comparator A1 is cut off, so that the output V3 of the comparator A1 cannot be kept "1" irrespective of conditions of the voltages V1 and V2.

Note that, under such condition that the transmission signal is "0", the output of the NAND gate G1 is "1", so that the transistor M1 turns OFF and the transistor M2 turns ON. As a result, the current consumption is suppressed to substantially "0". Further, when the transistor M3 turns ON due to the transmission signal that has been inversed by the inverter circuit IN1, the capacitor C1 is discharged, so that the voltage V1 becomes "0" again. This results in a standby condition for input of a next transmission signal ("E" section of FIG. 2).

Further, a relationship among (a) a period ("A" point to "B" point of FIG. 2) "tab" from a time when the transmission signal varies from "0" to "1" to a time when the protection circuit PR1 begins the protection operation, (b) the voltage V1, and (c) the voltage V2, is expressed as follows with a resistance R of the resistor R1 and a capacitance C of the capacitor C1.

$V1 = I1 \cdot tab/C$ $V2 = I2 \cdot R$ $V1 = V2$

Thus, the period "tab" is calculated as follows.

$"tab" = R \cdot C \cdot I2/I1$

The "tab" is set to be larger than a maximum pulse width of the transmission signal, so that the protection circuit begins the protection operation though a normal transmission signal pulse is being inputted. Thus, it is possible to avoid such disadvantage that a transmission pulse width is narrower than an input pulse width. Specifically, the aforementioned IrDA standard defines a maximum pulse width as being 88.55 μs, so that it is possible to normally transmit a transmission pulse by setting the "tab" so that "tab">88.55 μs. This is the same as in other embodiments described later.

Note that, in FIG. 2, the output V3 which is a reset pulse of the D flip-flop FF1 is illustrated so as to facilitate the description, but the pulse width corresponds to a time brought about as a delay time of circuit operation, and there is no logical difference between the "B" point and the "C" point. Thus, the output current Io and the power source current Icc drop right after the power source circuit PS1 stops substantially at the same time as in drop of the output V4, so that timings thereof are positioned between the "B" point and the "C" point. This is applicable to other embodiment, described later, in which a D flip-flop FF1 is provided.

Further, the technique in which a period from a time when the transmission signal varies from "0" to "1" to a time when the protection circuit begins the protection operation PR1 is set in the foregoing manner is applied to other embodiments described later.

Embodiment 2

Figure 3:
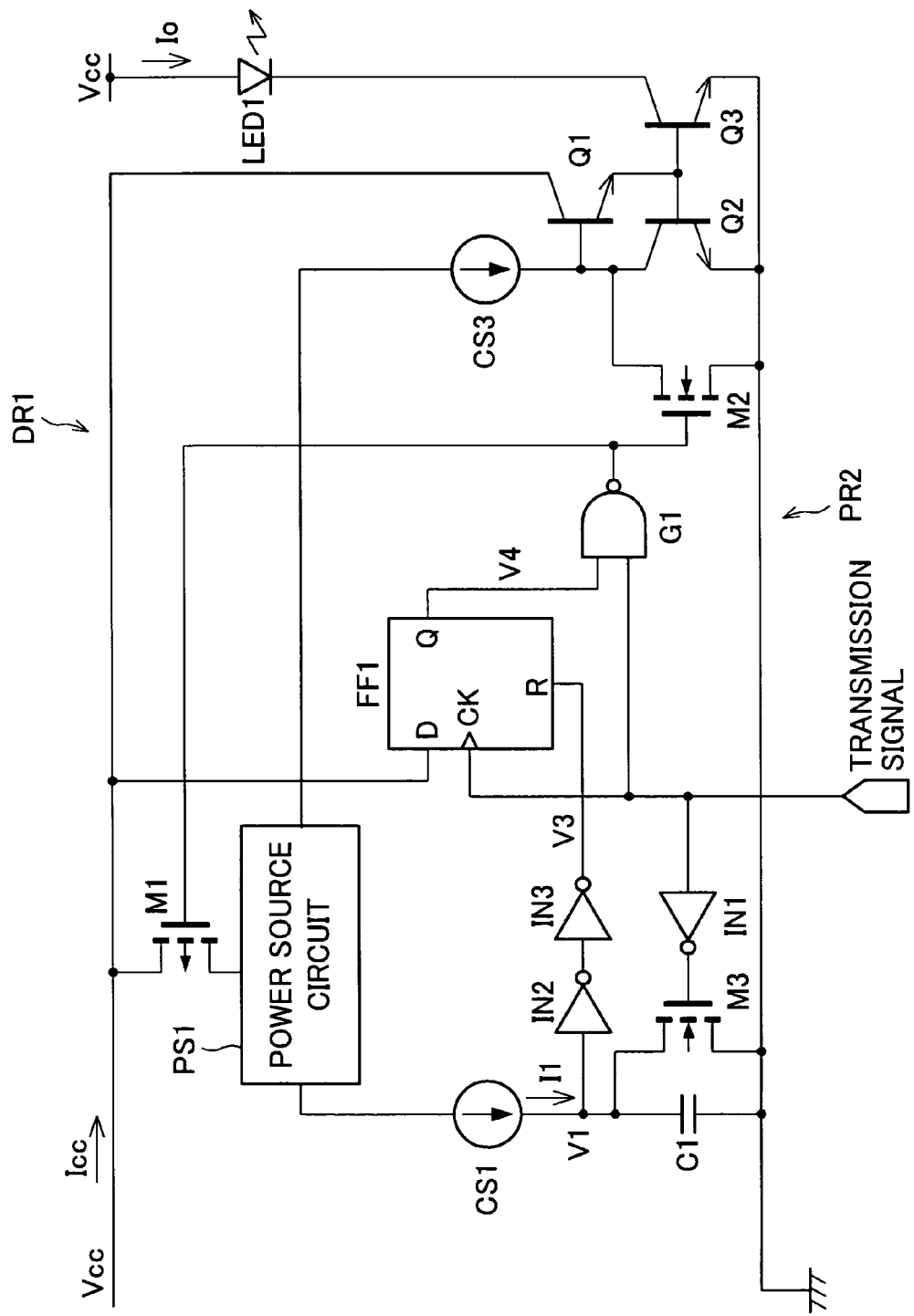
FIG. 3 is a circuit diagram showing an infrared transmitter circuit of Embodiment 2 of the present invention.
Figure 4:
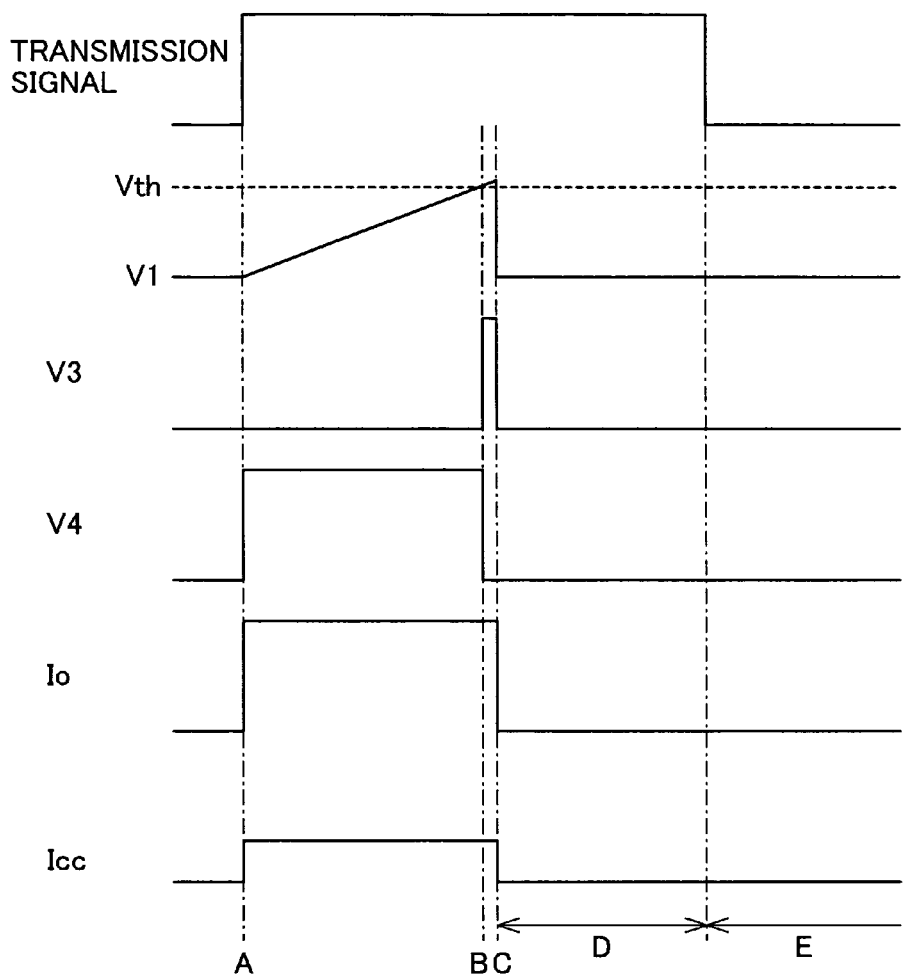
FIG. 4 is a waveform chart showing operation waveforms of the infrared transmitter circuit of FIG. 3.
Figure 5:
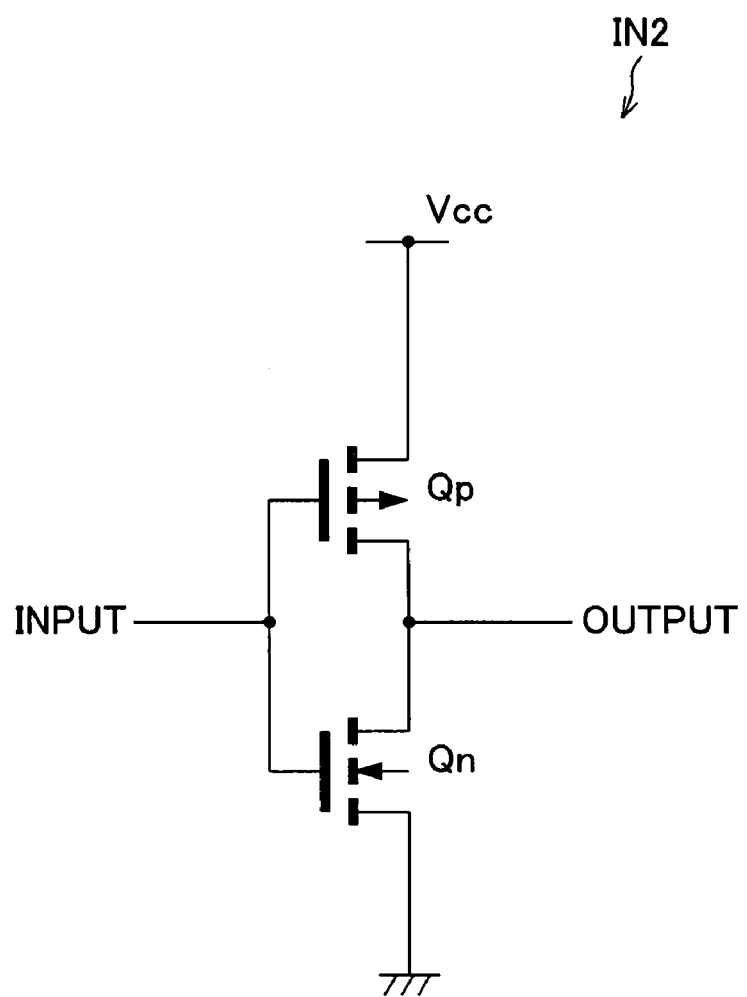
FIG. 5 is a circuit diagram showing an arrangement of an inverter circuit in each of infrared transmitter circuits of Embodiments 3, 5, and 6 of the present invention.

The following description will explain Embodiment 2 with reference to FIG. 3 to FIG. 5. Note that, in the present embodiment, the same reference signs are given to components having the same functions as those of components described in Embodiment 1, and description thereof is omitted.

FIG. 3 shows an arrangement of an infrared transmitter circuit according to the present embodiment. Further, FIG. 4 shows an operation timing of the infrared transmitter circuit.

As shown in FIG. 3, the infrared transmitter circuit is different from the infrared transmitter circuit of Embodiment 1 (FIG. 1) in that: the constant current source CS2, the resistor R1, and the comparator A1 are omitted, and inverter circuits IN2 and IN3 are added. In the infrared transmitter circuit, the transistors M1 to M3, the constant current sources CS1 and CS2, the NAND gate G1, the D flip-flop FF1, the inverter circuits IN1 to IN3, and the capacitor C1 constitute a protection circuit PR2 for preventing unnecessary lighting of the light emission diode LED1.

The inverter circuits IN2 and IN3 are provided in series between (i) a junction of the constant current source CS1 and the capacitor C1 and (ii) the reset terminal R of the D flip-flop FF1. For example, as shown in FIG. 5, the inverter circuit IN2 is an FET element (C-MOS) constituted of a P-channel FET transistor Qp and an N-channel FET transistor Qn in a complementary manner. The transistor Qp has a channel length of Lp and a channel width of Wp. Further, the transistor Qn has a channel length of Ln and a channel width of Wn.

Also in the infrared transmitter circuit arranged in this manner, as shown in FIG. 4, the transmission signal's variation from "0" to "1" causes the output V4 of the D flip-flop FF1 to vary from "0" to "1," so that the output of the NAND gate G1 becomes "0", as in the infrared transmitter circuit of FIG. 1. Thus, the transistor M1 turns ON and the power source circuit PS1 turns ON, and the transistor M2 turns OFF so as to open the collector-emitter line of the transistor Q2. Further, a current is supplied from the constant current source CS3 and the current mirror circuit constituted of the transistors Q1 to Q3 is made to operate, so that the output current Io based on an output current of the constant current source CS3 flows to the light emission diode LED1. This causes the light emission diode LED1 to begins lighting ("A" point of FIG. 4).

At this time, the output current 11 flowing from the constant current source CS1 causes the voltage V1 to rise with time. At a time when the voltage V1 exceeds a threshold voltage Vth of the inverter circuit IN2 ("B" point of FIG. 4), an output of the inverter circuit IN2 varies from "1", to "0", and an output of the inverter circuit IN3 positioned at the following stage varies from "0" to "1". This causes an output of the NAND gate G1 to vary from "0" to "1", so that the transistor M1 turns OFF as in the infrared transmitter circuit of FIG. 1, and the transistor M2 turns ON. As a result, the power source circuit SP1 turns OFF, so that the output current Io is stopped from being supplied to the light emission diode LED1 (protection operation of the protection circuit).

The transistor M1 turns OFF and cuts off the power source of the power source circuit PS1, so that an output of the constant current source CS1 for raising the voltage V1 becomes 0. Thus, also the voltage V3 becomes 0 again. However, the D flip-flop FF1 stores a reset condition, so that the output V4 of the D flip-flop FF1 is kept to be "0". Thus, even when the transmission signal remains "1", a condition under which the constant current source CS3 stops supplying a current and the output current Io is kept ("C" point of FIG. 4). Each of the inverter circuits IN1 to IN3, the D flip-flop FF1, the NAND gate G1, and the transistors M1 to M3 is constituted of an FET, so that each of these members hardly consumes a current under a non-operation condition. Thus, current consumption at the time of the protection operation ("D" section of FIG. 4) can be reduced to substantially 0.

Incidentally, under such condition that the power source circuit PS1 stops, electric charge variation of the capacitor C1 which has been fully charged differs depending on conditions of output impedance of the constant current source CS1, so that the voltage V1 is not necessarily "0". Thus, also the voltage V3 may not be "0". However, a reset condition based on reset input of the D flip-flop FF1 is merely kept, so that a protection condition between the B-C section and the D section is maintained. This is the same in Embodiment 5 described later.

Note that, under such condition that the transmission signal is "0", the output of the NAND gate G1 is "1", so that the transistor M1 turns OFF and the transistor M2 turns ON. As a result, the current consumption is suppressed to substantially "0". Further, when the transistor M3 turns ON due to the transmission signal that has been inversed by the inverter circuit IN1, the capacitor C1 discharges, so that the voltage V1 becomes "0" again. This results in a standby condition for input of a next transmission signal ("E" section of FIG. 4).

In the infrared transmitter circuit, the protection circuit PR2 is made to perform the protection operation when the voltage V1 exceeds a threshold voltage Vth of the inverter circuit IN2. The threshold voltage Vth is as follows in case where the inverter circuit IN2 is arranged as a C-MOS inverter circuit as shown in FIG. 5.

$$Vth=\{\sqrt{Kn}\cdot Vthn+\sqrt{Kp}\cdot(Vcc-Vthp)\}/(\sqrt{Kn}+\sqrt{Kp})$$

$$Kn=\mu n\cdot Coxn\cdot Wn/Ln$$

$$Kp=\mu p\cdot Coxp\cdot Wp/Lp$$

Here, parameters concerning an N-channel MOSFET in the foregoing expression are defined as follows.
μn: Carrier mobility of the channel
Coxn: Capacitance of a gate oxide film
Wn: Channel width
Ln: Channel length
Vthn: Threshold voltage Further, parameters concerning a P-channel MOSFET in the foregoing expression are defined as follows.
μp: Carrier mobility of the channel
Coxp: Capacitance of a gate oxide film
Wp: Channel width
Lp: Channel length
Vthp: Threshold voltage Thus, the device parameters of the transistors Qn and Qp in FIG. 5 or the output current 11 of the constant current source CS1 in FIG. 3 and a capacitance of the capacitor C1 are set to be appropriate values, so that it is possible to arbitrarily set a period from a time when the transmission signal varies from "0" to "1" to a time when the protection circuit PR2 begins the protection operation.

Note that, the present embodiment shows the arrangement in which the inverter circuit IN2 is constituted of a MOSFET as an example. However, even when a JFET (junction field effect transistor) is used as the inverter circuit IN2, it is possible to obtain the same effect as the foregoing arrangement by appropriately setting the device parameters in the same manner as in the foregoing arrangement.

Embodiment 3

Figure 6:
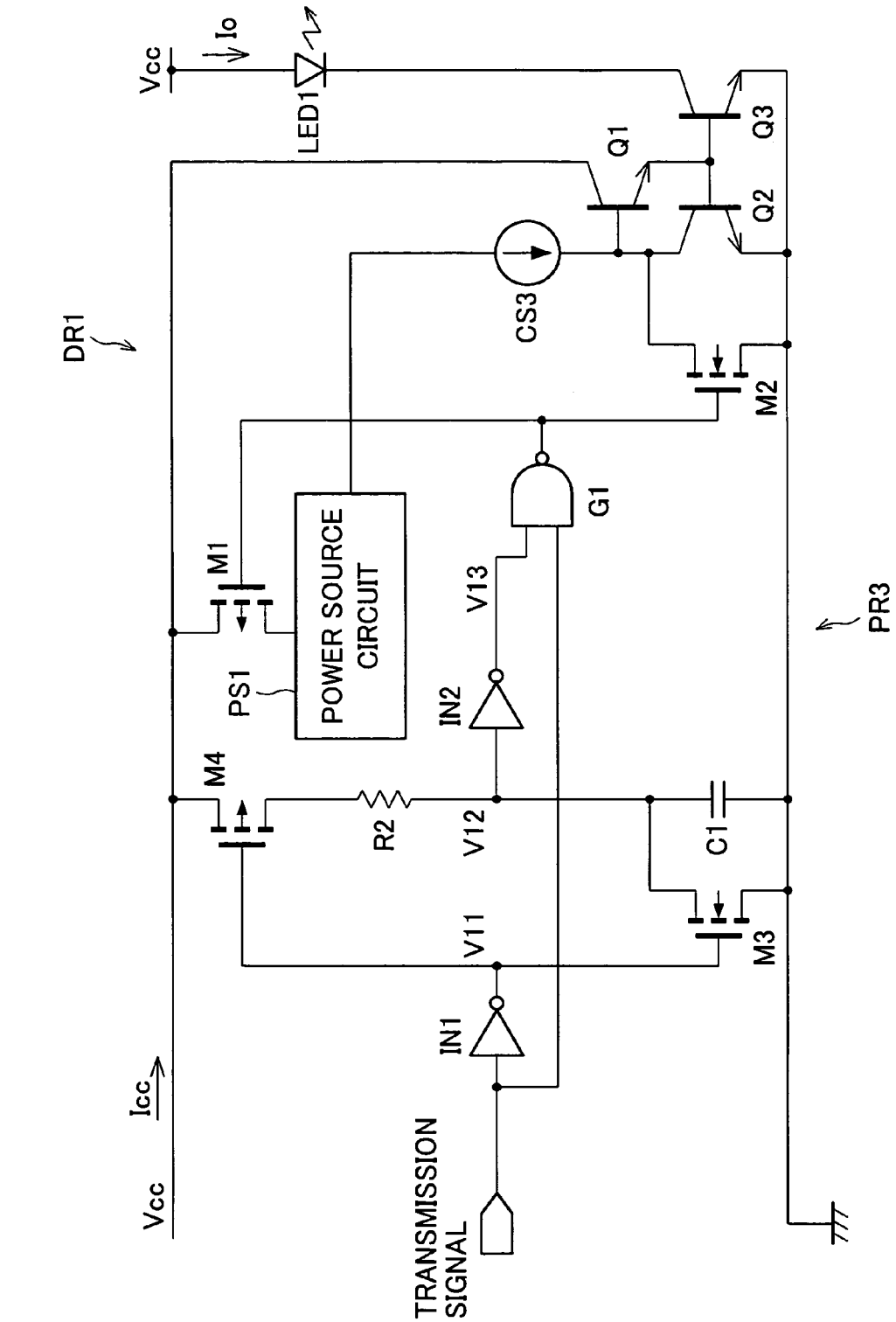
FIG. 6 is a circuit diagram showing an infrared transmitter circuit of Embodiment 3 of the present invention.
Figure 7:
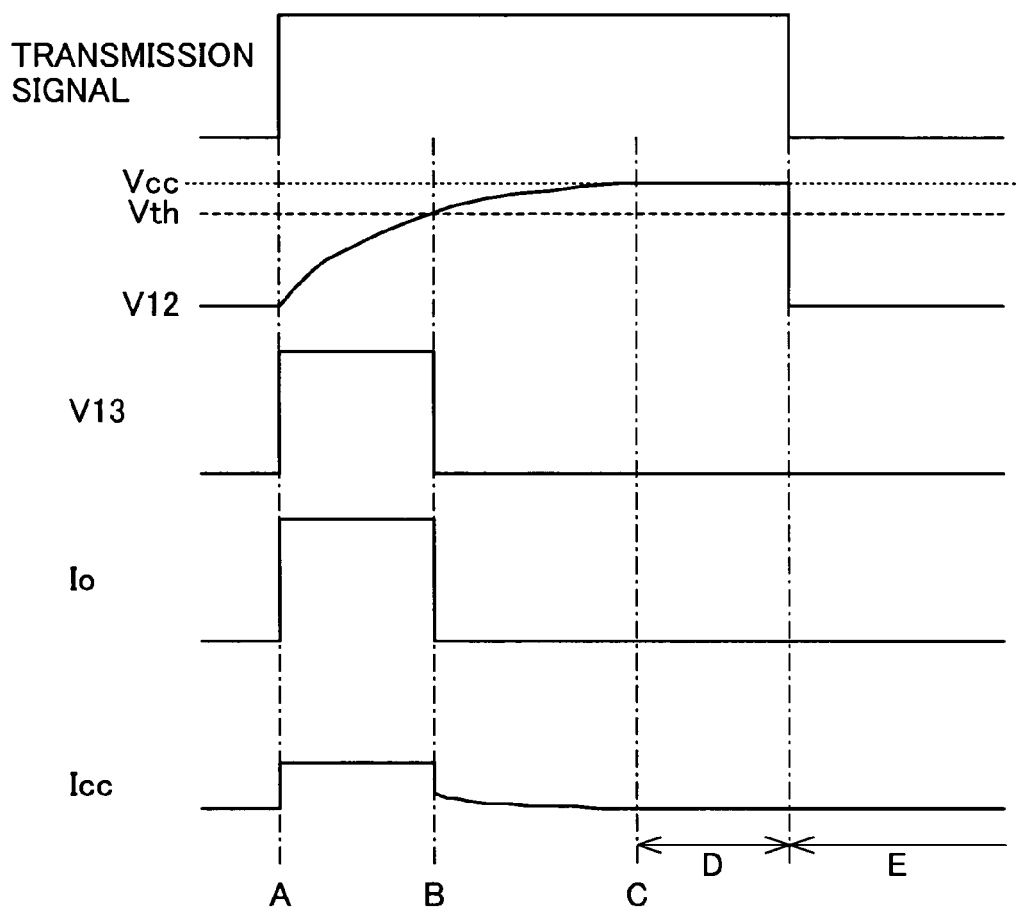
FIG. 7 is a waveform chart showing operation waveforms of the infrared transmitter circuit of FIG. 6.

The following description will explain Embodiment 3 with reference to FIG. 6 and FIG. 7. Note that, in the present embodiment, the same reference signs are given to components having the same functions as those of components described in Embodiments 1 and 2, and description thereof is omitted.

FIG. 6 shows an arrangement of an infrared transmitter circuit according to the present embodiment. Further, FIG. 7 shows an operation timing of the infrared transmitter circuit.

As shown in FIG. 6, the infrared transmitter circuit is different from the infrared transmitter circuit of Embodiment 2 (FIG. 3) in that: the constant current source CS1, the inverter circuit IN3, and the D flip-flop FF1 are omitted, and a resistor R2 and a transistor M4 are added. The transistor M4 is a P-channel FET. In the infrared transmitter circuit, the transistors M1 to M4, the NAND gate G1, the inverter circuits IN1 and IN2, the resistor R2, and the capacitor C1 constitute a protection circuit PR3 for preventing unnecessary lighting of the light emission diode LED1.

The transistor M4, the resistor R2, and the capacitor C1 are connected to each other in series between the power source line and the GND line. An input terminal of the inverter circuit IN2 is connected to a junction of the resistor R2 and the capacitor C1. Further, an output terminal of the inverter circuit IN1 is connected not only to the gate of the transistor M3 but also to a gate of the transistor M4.

In the infrared transmitter circuit arranged in this manner, as shown in FIG. 7, when the transmission signal is "0", the transistor M4 which functions as a second switching element turns OFF and the transistor M3 which functions as a first switching element turns ON, so that a path through which a charging current (power source current Icc) is made to flow to the capacitor C1 is cut and both ends of the capacitor C1 are short-circuited. Thus, the capacitor C1 is discharged (a condition under which the capacitor C1 is not charged).

When the inverter circuit IN1 inverses the transmission signal with the transmission signal's variation from "0" to "1", a voltage V11 which is an output thereof varies from "1" to "0". When the voltage V11 causes the transistor M3 to turn OFF and causes the transistor M4 to turn ON, a path through which a charging current is made to flow to the capacitor C1 is formed, and both ends of the capacitor C1 are opened, so that the capacitor begins to be charged via the resistor R2. Thus, a voltage V12 which functions as an input of the inverter circuit IN2 rises from 0.

At this time, an output V13 of the inverter circuit IN2 becomes "1" and an output of the NAND gate G1 becomes "0", so that the transistor M1 turns ON so as to turn ON the power source circuit PS1, and the transistor M2 turns OFF so as to open the collector-emitter line of the transistor Q2. Further, a current mirror circuit constituted of the transistors Q1 to Q3 is made to operate, so that the output current Io based on the output current of the constant current source CS2 flows to the light emission diode LED1. As a result, the light emission diode LED1 begins emitting light ("A" point of FIG. 7).

At a time when the voltage V12 which has been rising since commencement of charging of the capacitor C1 exceeds a threshold voltage Vth of the inverter circuit IN2 ("B" point of FIG. 7), the output V13 of the inverter circuit IN2 varies from "1" to "0". Thus, an output of the NAND gate G1 varies from "0" to "1", so that the transistor M1 turns OFF as in the infrared transmitter circuit of FIG. 1, and the transistor M2 turns ON. As a result, the power source circuit SP1 turns OFF, so that the output current Io stops flowing to the light emission diode LED1 (protection operation of the protection circuit PR3).

Also after the power source circuit SP1 turns OFF, the charging of the capacitor C1 is continued while the transmission signal is "1", so that the voltage V12 rises. However, it is impossible to further charge the capacitor C1 after the voltage V12 reaches the power source voltage Vcc, so that the power source current Icc which functions as a charging current does not flow ("C" point of FIG. 7), and current consumption such as (i) consumption of a current of the power source circuit SP1 which has stopped operating and (ii) consumption of the output current Io is suppressed to substantially 0 ("D" section of FIG. 7).

Note that, under such condition that the transmission signal is "0", the output of the NAND gate G1 is "1", so that the transistor M1 turns OFF and the transistor M2 turns ON, the current consumption is substantially 0. Further, under this condition, the transistor M3 turns ON and the transistor M4 turns OFF, so that the capacitor C1 is discharged. Thus, the voltage V12 becomes 0 again, which results in a standby condition for an input of a next transmission signal ("E" section of FIG. 7).

The voltage V12 of FIG. 6 is expressed as follows under such condition that: a factor of a time t elapsed after the transmission signal has varied from "0" to "1" is used, and an ON resistance of the transistor M3 is 0, and an OFF resistance of the transistor M4 is infinite.

$$V12 = Vcc \cdot [1 - \exp\{-t/(C1 \cdot R2)\}]$$

While, as described above, the threshold voltage Vth of the inverter circuit IN2 is as follows.

$$Vth = \{\sqrt{Kn} \cdot Vthn + Kp \cdot (Vcc - Vthp)\} / (\sqrt{Kn} + \sqrt{Kp})$$

Thus, the voltage V12 and the threshold voltage Vth are respectively set to be appropriate values, so that it is possible to appropriately set a period from a time when the transmission signal varies from "0" to "1" to a time when the protection circuit PR3 begins the protection operation.

Embodiment 4

Figure 8:
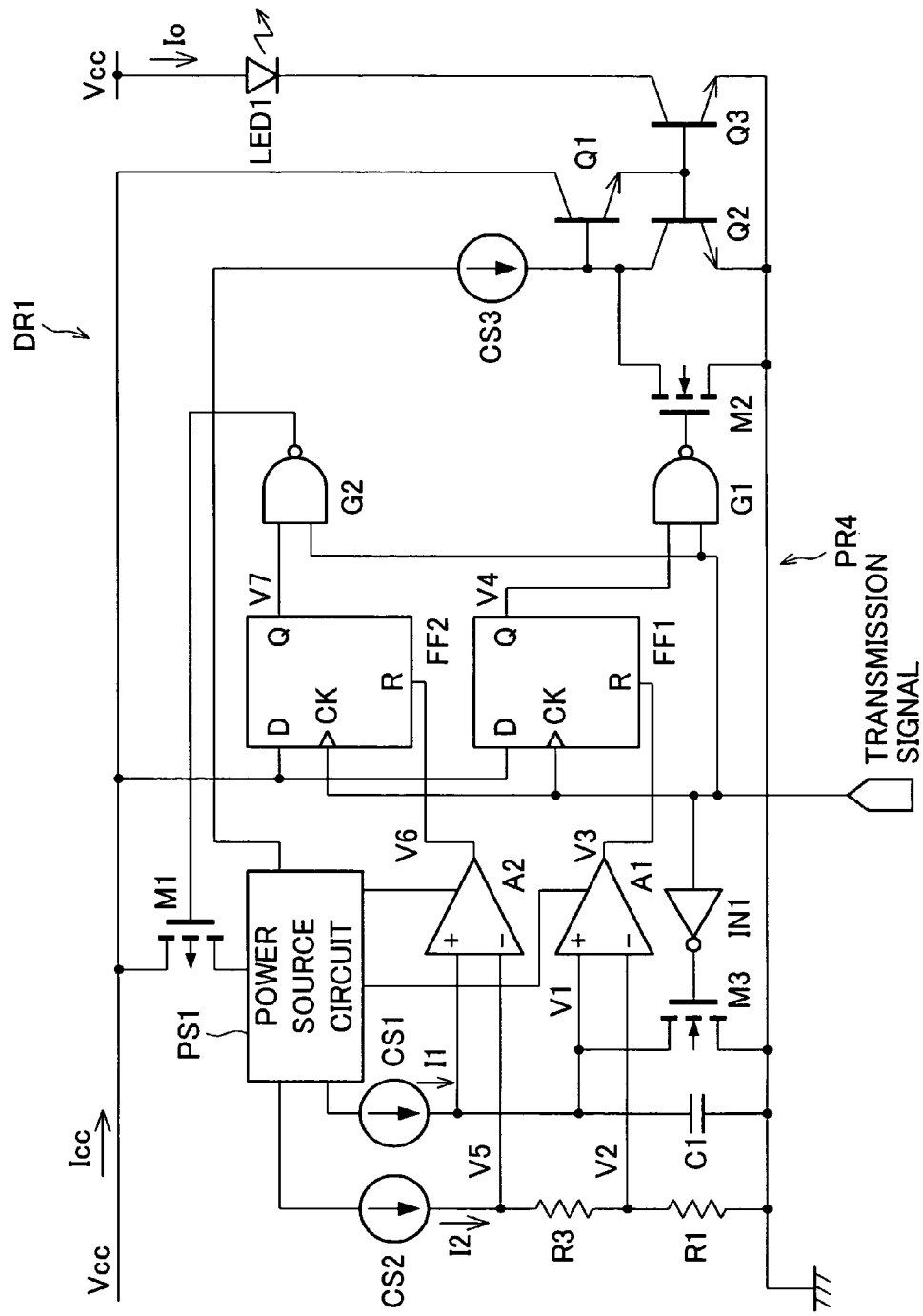
FIG. 8 is a circuit diagram showing an infrared transmitter circuit of Embodiment 4 of the present invention.
Figure 9:
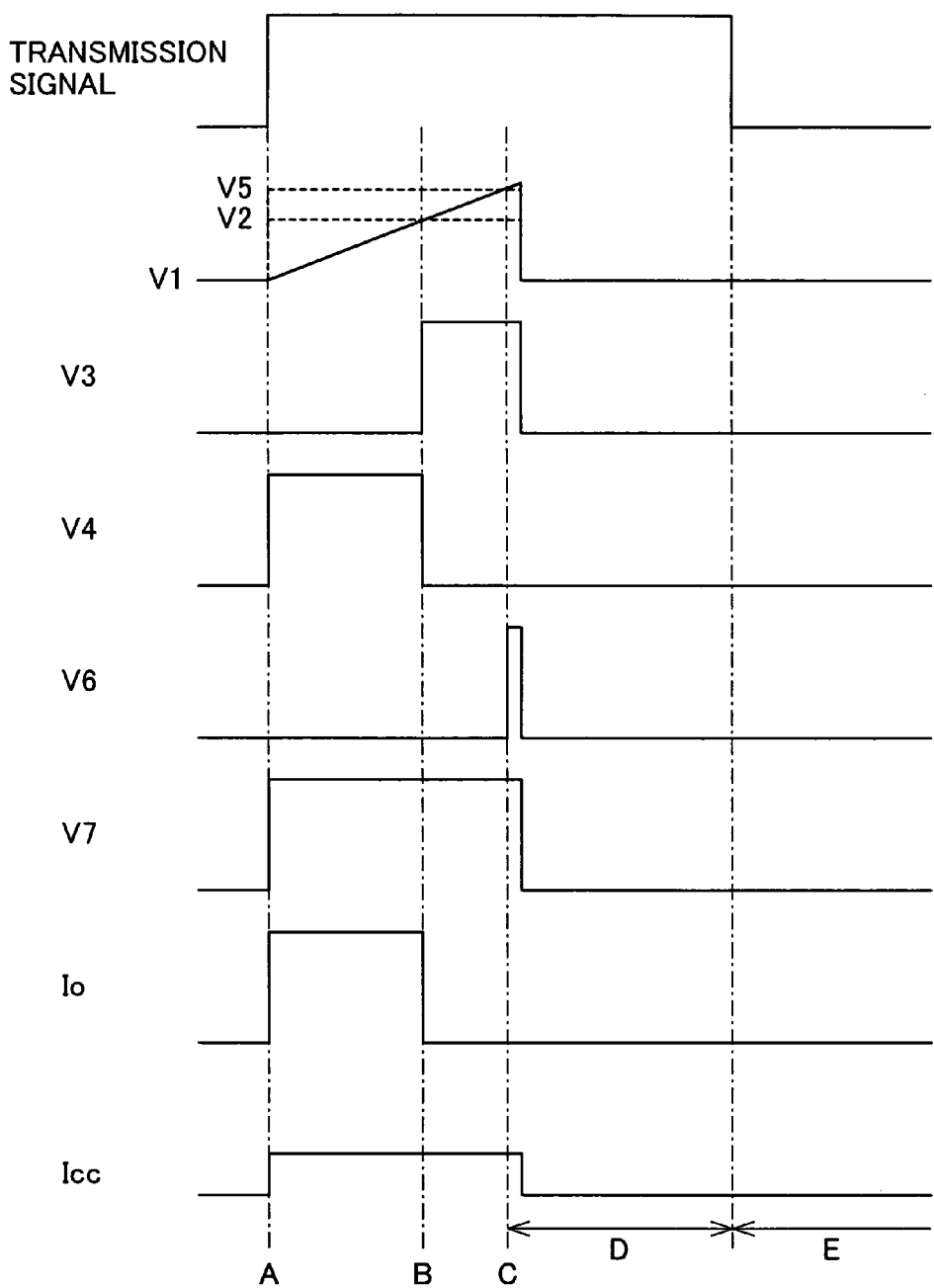
FIG. 9 is a waveform chart showing operation waveforms of the infrared transmitter circuit of FIG. 8.
Figure 10:
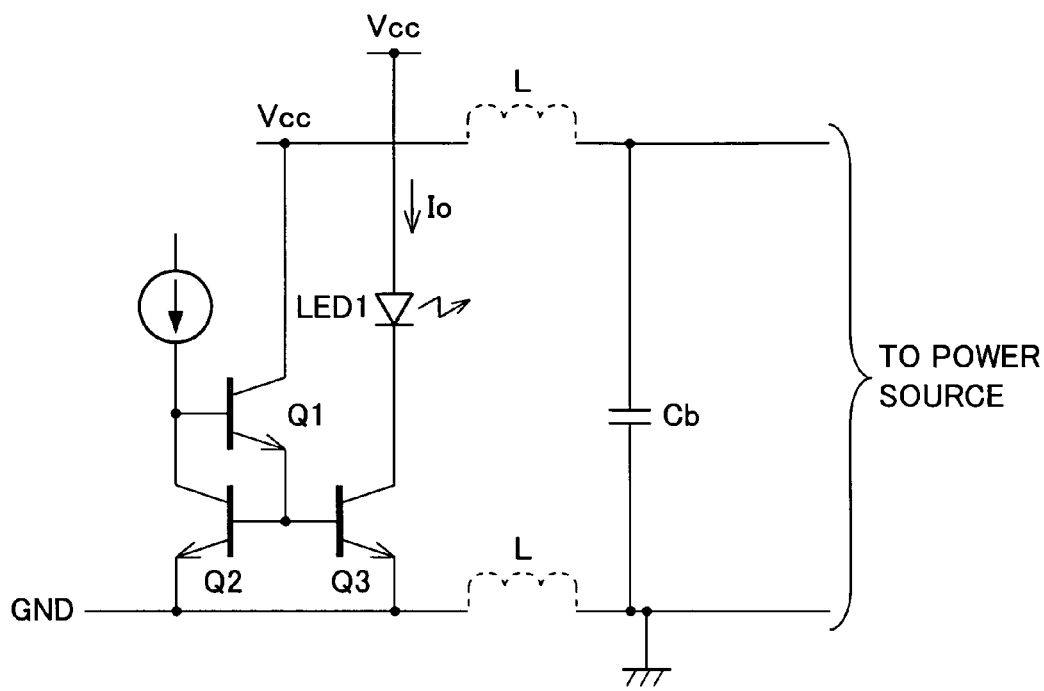
FIG. 10(a) and FIG. 10(b) are respectively a circuit diagram and a waveform chart each of which illustrates how variation of an output current to a light emission diode of the infrared transmitter circuit of FIG. 8 causes voltage variation of a power source line.
Figure 10:
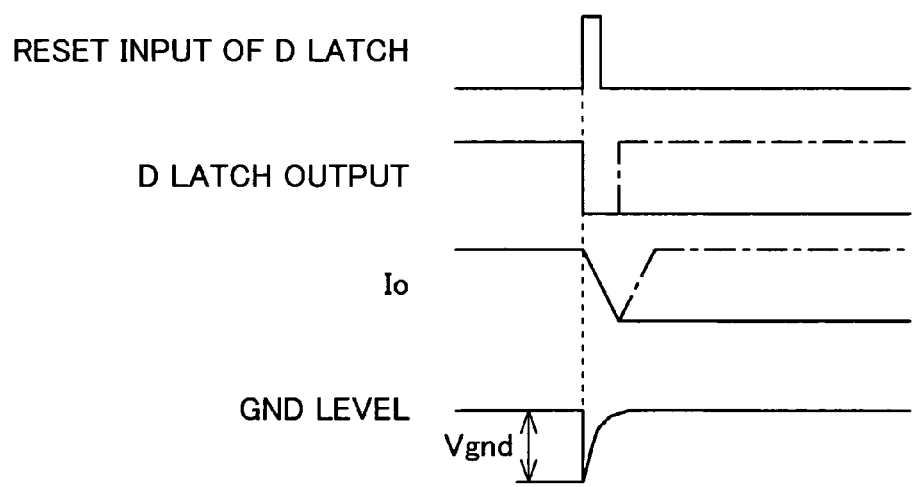

The following description will explain Embodiment 4 of the present invention with reference to FIG. 8 to FIG. 10. Note that, in the present embodiment, the same reference signs are given to components having the same functions as those of components described in Embodiment 1, and description thereof is omitted.

FIG. 8 shows an arrangement of an infrared transmitter circuit of the present embodiment. Further, FIG. 9 shows an operation timing of the infrared transmitter circuit.

As shown in FIG. 8, the infrared transmitter circuit is different from the infrared transmitter circuit of Embodiment 1 (FIG. 1) in that: a resistor R, a comparator A2, a D flip-flop FF2, and a NAND gate G2 are added. In the infrared transmitter circuit, the transistors M1 to M3, the constant current sources CS1 and CS2, the NAND gates G1 and G2, the D flip-flops FF1 and FF2, the comparators A1 and A2, the inverter circuits IN1 and IN2, the resistors R1 and R3, and the capacitor C1 constitute a protection circuit PR4 for preventing unnecessary lighting of the light emission diode LED1.

The resistor R3 is provided between the constant current source CS2 and the resistor R1. A junction of the resistor R3 and the constant current source CS2 is connected to an inversion input terminal of the comparator A2, and a junction of the capacitor C1 and the constant current source CS1 is connected to a non-inversion input terminal of the comparator A2. The power source circuit SP1 gives the comparator A2 a voltage and a current that are required in operating the comparator A2. An output terminal of the comparator A2 is connected to a reset terminal R of the D flip-flop FF2.

The transmission signal is inputted to a positive logic clock input terminal CK of the D flip-flop FF2. Further, a data input terminal D of the D flip-flop FF2 is connected to the power source line. An output terminal Q of the D flip-flop FF2 is connected to one of input terminals of the NAND gate G2. The transmission signal is inputted to the other input terminal of the NAND gate G2. Further, an output terminal of the NAND gate G1 is merely connected to a gate of the transistor M2, and is not connected to a gate of the transistor M1. Instead, an output terminal of the NAND gate G2 is connected to the gate of the transistor M1.

Here, differences between the infrared transmitter circuit arranged in the foregoing manner and the infrared transmitter circuit of FIG. 1 in terms of operations will be described as follows.

As shown in FIG. 9, when the transmission signal varies from "0" to "1" so as to turn ON the power source circuit SP1, an output current 12 flowing from the constant current source CS2 flows to the resistors R1 and R3 that are connected in series, so that two voltages V2 and V5 (V2<V5) that are different from each other are generated. These voltages V2 and V5 are supplied to the comparators A1 and A2 respectively as reference voltages. The comparator A1 compares the voltage V1, which rises with time, with the voltage V2, so as to vary the output V3 from "0" to "1" at a time when V1>V2 ("B" point of FIG. 9).

Thus, an output of the NAND gate G1 varies to "1" while an output V4 of the D flip-flop FF1 varies to "0", so that the transistor M2 turns ON. As a result, the output current Io is not supplied to the light emission diode LED1 (protection operation of the protection circuit PR4). At this time, the transistor M1 is still ON, so that the power source circuit PS1 keeps under an operation condition.

Thereafter, the comparator A2 compares the voltage V1 with the voltage V5, so as to vary an output V6 from "0" to "1" at a time when V1>V5 ("C" point of FIG. 9). Thus, an output of the NAND gate G2 varies to "1" while an output V7 of the D flip-flop FF2 varies to "0", so that the transistor M1 turns OFF. As a result, the power source current Icc stops flowing, so that the power source circuit SP1 turns OFF.

In the "D" section and the "E" section of FIG. 9, the infrared transmitter circuit operates in the same manner as in the infrared transmitter circuit of FIG. 1, so that description thereof is omitted.

Here, effects obtained by performing the foregoing operations are described as follows with reference to FIG. 10(a) and FIG. 10(b).

When the output current Io supplied to the light emission diode LED1 drastically drops to 0 due to the protection operation of the protection circuit PR4, the power source voltage Vcc and a current flowing to the GND line vary via the transistor Q3 in which the output current Io flows. In order to prevent the power source voltage Vcc from being varied by variation of the current as much as possible, it is preferable to install a bypass capacitor Cb between two power source lines of the infrared transmitter circuit (between the power source line and the GND line) with a shortest wiring. However, it is impossible to drop an inductance component L of the power source line to 0 due to (i) a relationship with respect to other elements in terms of an installation position, (ii) wiring limitation on a print board, (ii) wiring of the power source line in the infrared transmitter circuit. Thus, due to the inductance component L, the variation of the output current Io flowing to the light emission diode LED1 causes voltage variation of the power source line.

As an example, the output current Io flowing to the light emission diode LED1 is 500 mA, and a time taken to block off the output current Io by causing the protection circuit PR4 to perform the protection operation is 50 ns, and an inductance component of a wiring of the power source line (the GND line in FIG. 10(a)) is 50 nH. Under this condition, voltage variation ΔVgnd in the GND line is expressed as follows.

$$\Delta Vgnd = L \cdot \Delta io / \Delta t = 50 \text{ nH} \cdot 500 \text{ mA} / 50 \text{ ns} = 0.5V$$

Each of the infrared transmitter circuits according to all the embodiments including the present embodiment is characterized in that it is possible to drop the current consumption to substantially 0 by stopping an operation of the power source circuit SP1 with the protection operation of the protection circuit. Particularly, in the present embodiment, the D flip-flaps FF1 and FF2 (D latch) are used as means for storing the protection operation condition of the protection circuit PR4 after the constant current source circuit stops. The D latch hardly consumes currents under a non-operation condition, but steadily operates under such condition that the protection circuit PR4 operates. Thus, although an output of the D latch varies from "1" to "0" due to the D latch's reset input variation from "0" to "1", the voltage variation ΔVgnd in the GND line may result in inversion as shown by a chain line of FIG. 10(b). In this case, the output current Io begins flowing as shown by the chain line of FIG. 10(b), so that the protection circuit PR4 does not perform the protection operation appropriately.

The inversion of the D latch output is described as follows by taking the infrared transmitter circuit of Embodiment 2 as an example.

The protection circuit PR4 operates at a "C" point of FIG. 2, so that the power source circuit PS1 stops. As to input conditions of respective terminals of the D flip-flop FF1 at this time, the input terminal D is "1", and the clock terminal CK is "1", and the reset terminal R is "0". Thus, the D flip-flop FF1 merely outputs "0" as the output V4 due to the immediately preceding reset input, so that the D flip-flop FF1 is ready to output "1" in response to the clock input. When a power source output for the logic circuit including the D flip-flop FF1 varies under the foregoing condition, a displacement current is given to a parasitic capacitance of the FET element constituting the D flip-flop FF1, so that a potential in the D flip-flop FF1 varies, which may cause an action equal to trigger pulse input of the clock input.

In order to avoid such disadvantage, the power source circuit SP1 does not stop at such timing that the output current Io flowing to the light emission diode LED1 drastically drops to 0 due to the protection operation of the protection circuit PR4, but the power source circuit SP1 stops after the voltage variation ΔVgnd of the GND line that is caused by transition of the output current Io ceases. Thus, even in case where the voltage variation ΔVgnd of the GND line that is caused by transition of the output current Io results in inversion of the output of the D flip-flop FF1, when the power source circuit SP1 is made to stop by varying an output of the D flip-flop FF2 to "0", thereafter, it is possible to stop supplying the output current Io to the light emission diode LED1 without fail.

Note that, the voltage variation ΔVgnd is brought about also by current variation which occurs at the time of stoppage of the power source circuit SP1. However, generally, a current consumed in the power source circuit SP1 is much smaller than the output current Io to the light emission diode LED1, so that a level of ΔVgnd can be ignored.

Further, a timing at which the power source circuit SP1 is stopped should be set to be a timing after the voltage variation ΔVgnd ceases as described above. Moreover, the voltage variation ΔVgnd occurs during a transition period of the output current Io flowing to the light emission diode LED1. Thus, the timing at which the power source circuit SP1 is stopped (a timing to stop supplying the power source current Icc) should be set to be later than a timing at which the output current Io flowing to the light emission diode LED1 becomes 0 due to the protection operation of the protection circuit PR4 as shown in FIG. 9.

Embodiment 5

Figure 11:
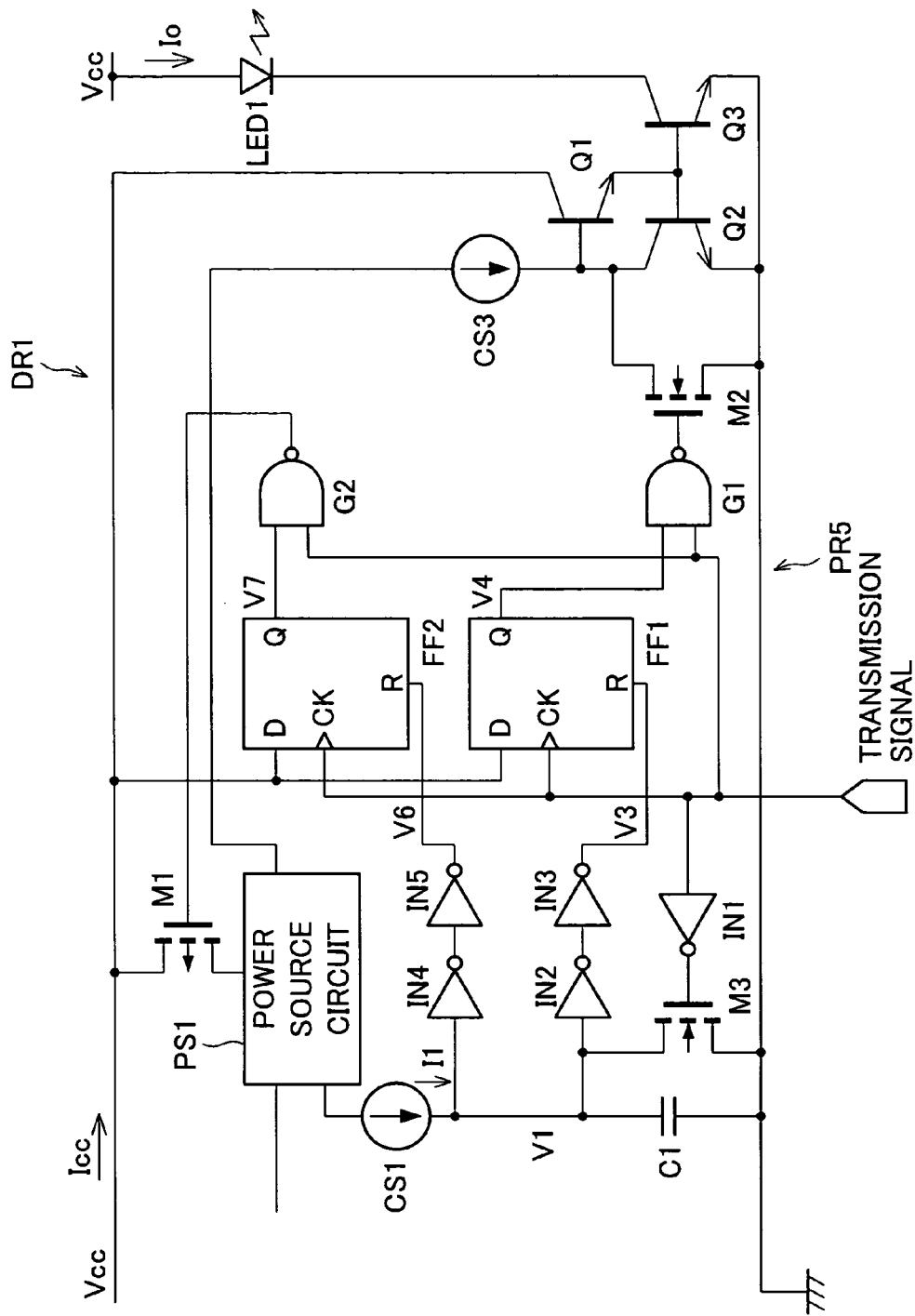
FIG. 11 is a circuit diagram showing an infrared transmitter circuit of Embodiment 5 of the present invention.
Figure 12:
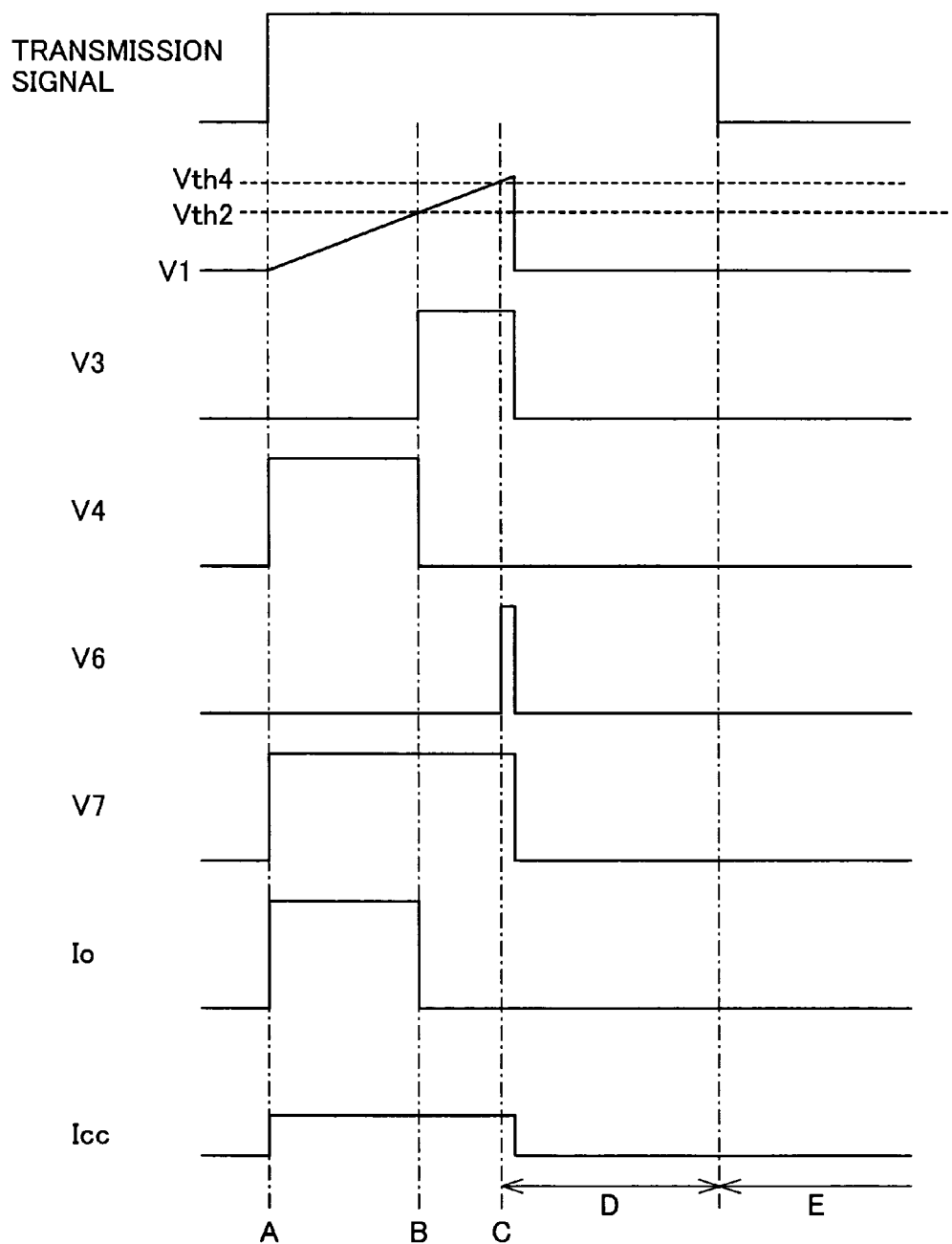
FIG. 12 is a waveform chart showing operation waveforms of the infrared transmitter circuit of FIG. 11.

The following description will explain Embodiment 5 with reference to FIG. 11 and FIG. 12. Note that, the same reference signs are given to components having the same functions as those of components described in Embodiments 2 and 4, and description thereof is omitted.

FIG. 11 shows an arrangement of an infrared transmitter circuit according to the present embodiment. Further, FIG. 12 shows an operation timing of the infrared transmitter circuit. In the infrared transmitter circuit, the transistors M1 to M3, the constant current source CS1, the NAND gates G1 and G2, the D flip-flop FF1 and FF2, the inverter circuits IN1 to IN5, and the capacitor C1 constitute a protection circuit PR5 for preventing unnecessary lighting of the light emission diode LED1.

As shown in FIG. 11, the infrared transmitter circuit is different from the infrared transmitter circuit of Embodiment 2 (FIG. 3) in that: inverter circuits IN4 and IN5, and the D flip-flop FF2 and the NAND gate G2 that are included in the infrared transmitter circuit of Embodiment 2 are added. How the D flip-flop FF2 and the NAND gate G2 correspond to other elements is the same as in the infrared transmitter circuit of FIG. 4 except for the reset terminal R of the D flip-flop FF2. In the infrared transmitter circuit of the present embodiment, the inverter circuits IN4 and IN5 are connected in series between (i) a junction of the constant current source CS1 and the capacitor C1 and (ii) the reset terminal R.

As shown in FIG. 5 for example, also the inverter circuit IN4 is an FET element (C-MOS) constituted of a P-channel FET transistor Qp and an N-channel FET transistor Qn in a complementary manner as in the inverter circuit IN2. In the infrared transmitter circuit of the present embodiment, a threshold voltage Vth2 of the inverter circuit IN2 is set to be lower than a threshold voltage Vth4 of the inverter circuit IN4 (Vth2<Vth4).

Here, the following description explains differences between the infrared transmitter circuit of the present embodiment and the infrared transmitter circuit of FIG. 3 in terms of an operation.

As shown in FIG. 12, when the power source circuit SP1 is turned ON by a transmission signal's variation from "0" to "1" ("A" point of FIG. 12), the capacitor C1 is charged by an output current I1 from the constant current source CS1, so that a voltage V1 which occurs due to the foregoing condition rises with time. When the voltage V1 is inputted to the inverter circuits IN2 and IN4, an output of the inverter circuit IN2 varies from "1" to "0" at a time when V1>Vth2 ("B" point of FIG. 12). With this variation, the output V3 of the inverter circuit IN3 varies from O" " to "1". Thus, the output V4 of the D flip-flop FF1 varies to "0", and an output of the NAND gate G1 varies to "1", so that the transistor M2 turns ON so as to stop supplying the output current Io to the light emission diode LED1 (protection operation of the protection circuit PR5). At this time, the transistor M1 is still ON, so that the power source circuit PS1 keeps its operation condition.

Thereafter, an output of the inverter circuit IN4 varies from "1" to "0" at a time when V1>Vth4 ("C" point of FIG. 12). With this variation, an output V6 of the inverter circuit IN5 varies from "0" to "1". Thus, an output V7 of the D flip-flop FF2 varies to "0", and an output of the NAND gate G2 varies to "1", so that the transistor M1 turns OFF. As a result, the power source current Icc stops flowing, so that the power source circuit PS1 turns OFF.

As described in Embodiment 2, by appropriately setting a process parameter, it is possible to control a threshold voltage of an inverter circuit. Thus, it is possible to arbitrarily set (a) a period from a time when the transmission signal varies from "0" to "1" to a time when the protection circuit PR5 begins the protection operation and (b) a period until the power source circuit PS1 stops. Thus, the infrared transmitter circuit of the present embodiment can obtain the same effect as in the infrared transmitter circuit of Embodiment 4.

Embodiment 6

Figure 13:
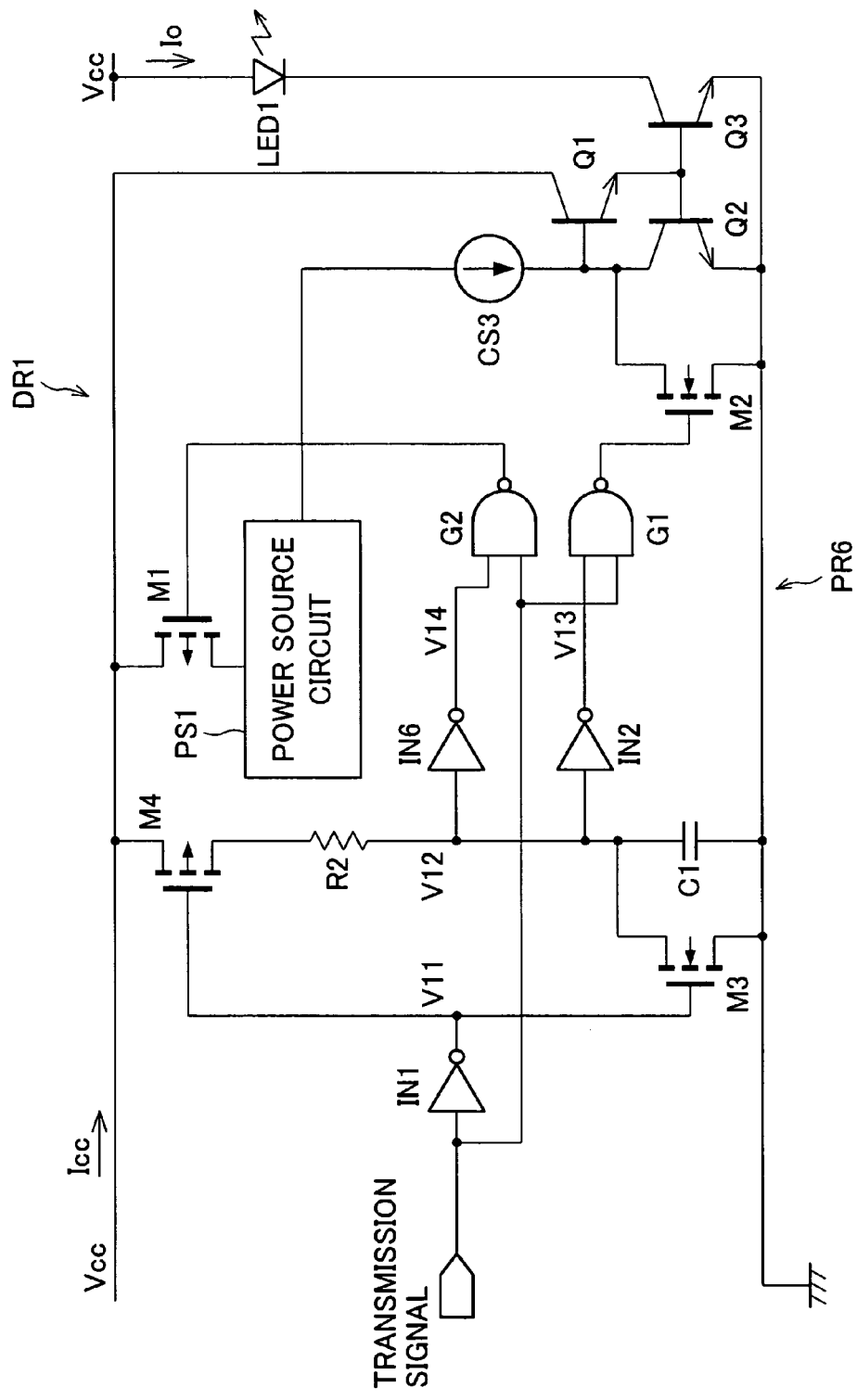
FIG. 13 is a circuit diagram showing an infrared transmitter circuit of Embodiment 6 of the present invention.
Figure 14:
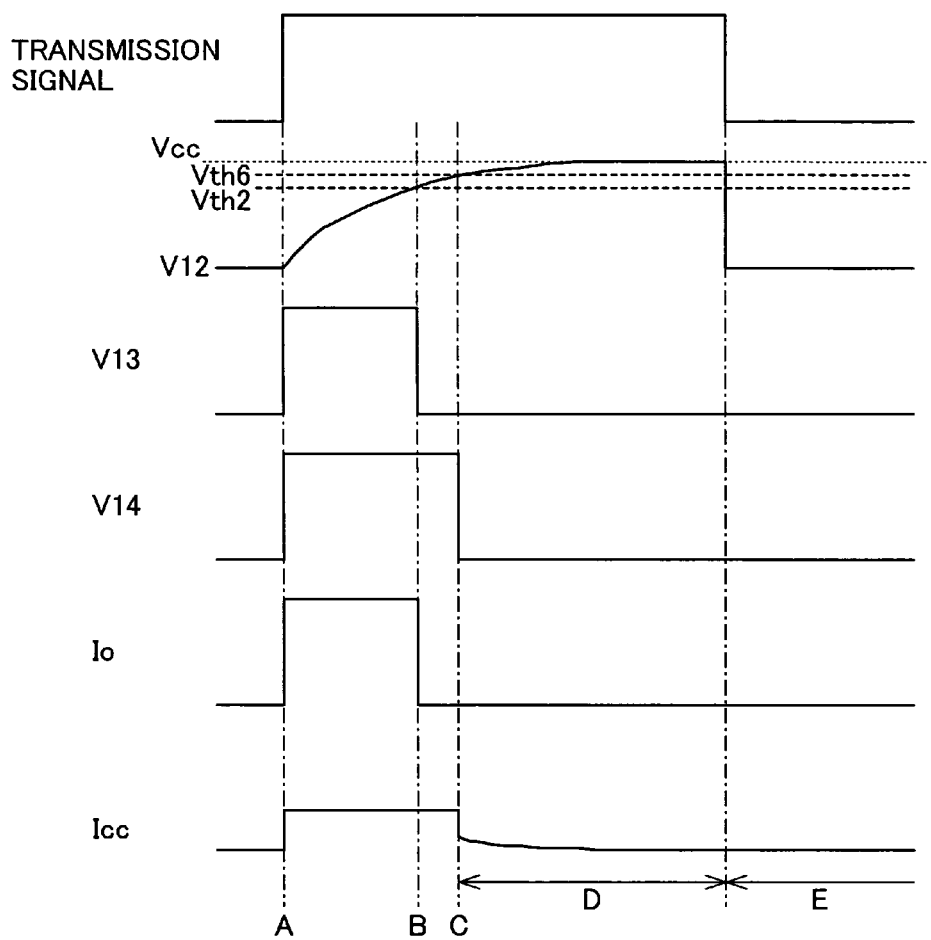
FIG. 14 is a waveform chart showing operation waveforms of the infrared transmitter circuit of FIG. 13.

The following description will explain Embodiment 6 with reference to FIG. 13 and FIG. 14. Note that, in the present embodiment, the same reference signs are given to components having the same functions as those of components described in Embodiments 3 and 4, and description thereof is omitted.

FIG. 13 shows an arrangement of an infrared transmitter circuit according to the present embodiment. Further, FIG. 14 shows an operation timing of the infrared transmitter circuit.

As shown in FIG. 13, the infrared transmitter circuit is different from the infrared transmitter circuit of Embodiment 3 (FIG. 6) in that: an inverter circuit IN6 and the NAND gate G2 included in the infrared transmitter circuit of Embodiment 4 (FIG. 8) are added. How the NAND gate G2 and the transistor M1 correspond to each other is the same as in the infrared transmitter circuit of FIG. 8. In the infrared transmitter circuit, the inverter IN6 is provided between (i) a junction of the resistor R2 and the capacitor C1 and (ii) one of the input terminals of the NAND gate G2. In the infrared transmitter circuit, the transistors M1 to M4, the NAND gates G1 and G2, the inverter circuits IN1, IN2, and IN6, the resistor R2, and the capacitor C1 constitute a protection circuit PR6 for preventing unnecessary lighting of the light emission diode LED1.

As shown in FIG. 5 for example, also the inverter circuit IN6 is an FET element (C-MOS) constituted of a P-channel FET transistor Qp and an N-channel FET transistor Qn in a complementary manner as in the inverter circuit IN2. In the infrared transmitter circuit of the present embodiment, a threshold voltage Vth2 of the inverter circuit IN2 is set to be lower than a threshold voltage Vth6 of the inverter circuit IN6 (Vth2<Vth6).

Here, the following description explains differences between the infrared transmitter circuit of the present embodiment and the infrared transmitter circuit of FIG. 6 in terms of an operation.

As shown in FIG. 14, when the power source circuit SP1 is turned ON by a transmission signal's variation from "0" to "1," ("A" point of FIG. 14), the capacitor C1 is charged by a voltage current Icc, so that a voltage V12 which occurs due to the foregoing condition rises with time. When the voltage V12 is inputted to the inverter circuits IN2 and IN6, an output V13 of the inverter circuit IN2 varies from "1" to "0" at a time when V12>Vth2 ("B" point of FIG. 14). Thus, when an output of the NAND gate G1 varies to "1", the transistor M2 turns ON, so as to stop supplying the output current Io to the light emission diode LED1 (protection operation of the protection circuit PR6). At this time, the transistor M1 is still ON, so that the power source circuit PS1 keeps its operation condition.

Thereafter, an output V14 of the inverter circuit IN6 varies from "1" to "0" at a time when V12>Vth6 ("C" point of FIG. 14). With this variation, an output of the NAND gate G2 varies to "1", so that the transistor M1 turns OFF. As a result, the power source current Icc stops flowing, so that the power source circuit PS1 turns OFF.

As described in Embodiment 2, by appropriately setting a process parameter, it is possible to control a threshold voltage of an inverter circuit. Thus, it is possible to arbitrarily set (a) a period from a time when the transmission signal varies from "0" to "1" to a time when the protection circuit PR6 begins the protection operation and (b) a period until the power source circuit PS1 stops. Thus, the infrared transmitter circuit of the present embodiment can alleviate the current variation of the power source line by deviating a timing to stop supplying the output current Io to the LED1 (protection operation of the protection circuit PR6) from a timing to turn OFF the power source circuit PS1. As a result, variation of the power source voltage is reduced, and influences that the variation gives to the inverter circuits IN2 and IN6 are suppressed, so that it is possible to operate the protection circuit PR6 at a more precise timing.

Embodiment 7

Figure 15:
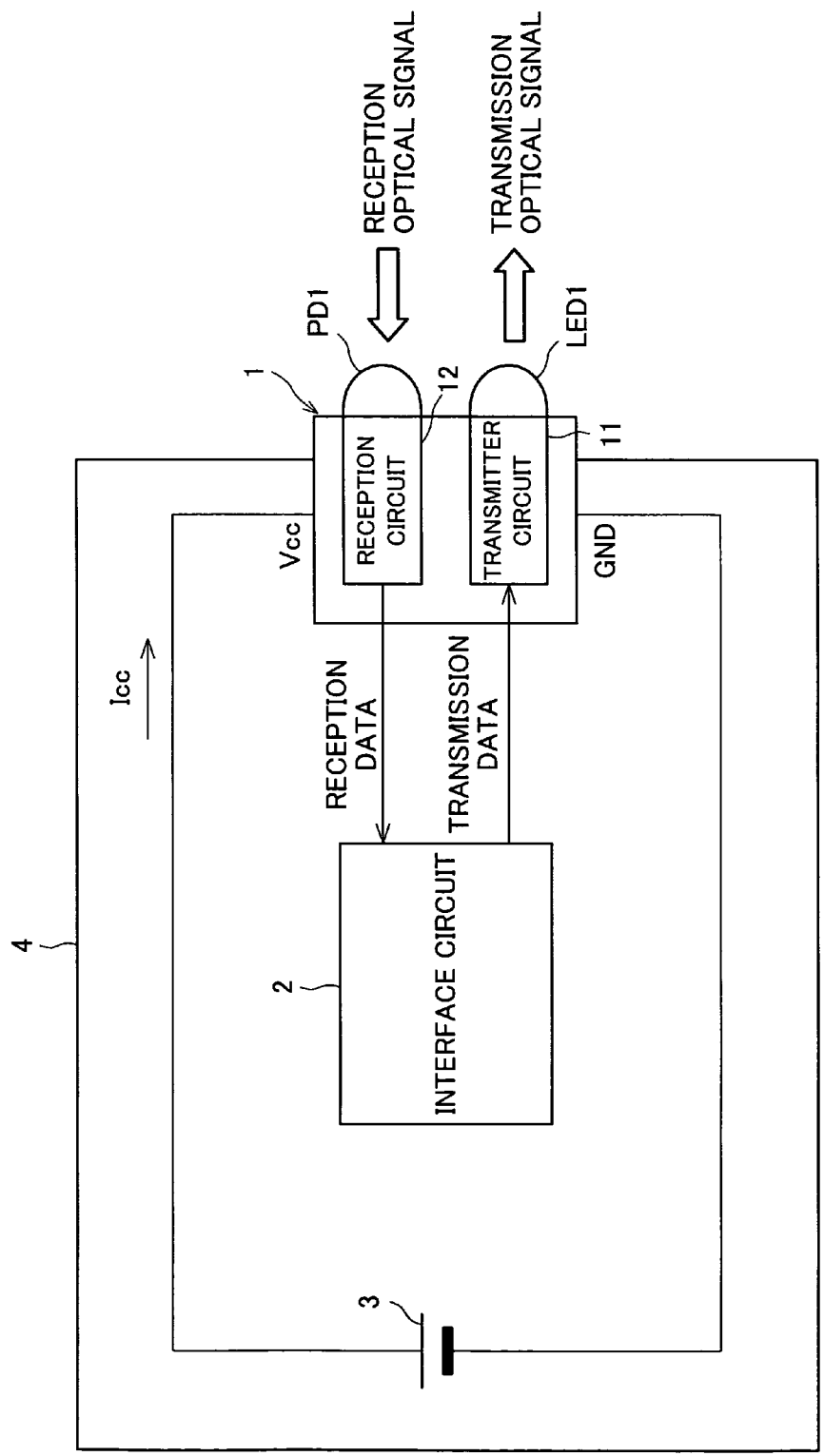
FIG. 15 shows an electronic device of Embodiment 7 of the present invention.

The following description will explain Embodiment 7 concerning an electronic device provided with the infrared transmitter circuit of the present invention with reference to FIG. 15. Note that, in the present embodiment, the same reference signs are given to components having the same functions as those of components described in the Embodiments 1 to 6, and description thereof is omitted.

FIG. 15 shows an arrangement of an electronic device according to the present embodiment. As shown in FIG. 15, the electronic device has an infrared communication function, and includes an IrDA module 1, an interface circuit 2, a battery 3, and a housing 4 in order to perform data transmission/reception with respect to external devices by means of an infrared ray.

The IrDA module which functions as an infrared communication element includes a transmitter circuit 11 and a reception circuit 12 therein, and includes a light emission diode LED1 and a photodiode PD1 that are provided on the housing so as to be externally exposed. In the housing 4, the interface circuit 2 and the battery 3 are provided.

The interface circuit 2 generates transmission data (transmission signal) which is supplied to the transmitter circuit 11 by performing a modulation process or the like in accordance with transmission information. Further, the interface circuit 2 outputs reception information by performing a demodulation process or the like in accordance with reception data (reception signal) from the reception circuit 12. The battery 3 is provided so as to supply power to the IrDA module 1, and is connected to the IrDA module 1 via the power source line (Vcc) and the GND line. The battery 3 may supply power to the interface circuit 2.

The reception circuit 12 amplifies an electric signal, which has been converted from a reception optical signal by the photodiode PD1, so as to output reception data. The transmitter circuit 11 includes a circuit for driving the light emission diode LED1 in order to cause the light emission diode LED1 to convert the transmission signal (electric signal) into a transmission optical signal and to output the transmission optical signal.

The transmitter circuit 11 including the light emission diode LED1 is constituted of any one of the infrared transmitter circuits of Embodiments 1 to 6. Thus, it is possible to obtain effects, realized by the infrared transmitter circuits, also in the electronic device.

Note that, the IrDA module 1 uses the battery 3 as a single power source, but a protection circuit power source line (Icc) and a light emission diode driving power source line (Io) are separately provided as power source lines of the transmitter circuit 11.

As in each of the aforementioned infrared transmitter circuits, in case of operating the transmitter circuit 11 so that the transmitter circuit 11 transmits an optical signal under such condition that the transmission signal is "1" (Vcc level: high level (active)) and the transmitter circuit 11 does not transmit the optical signal under such condition that the transmission signal is "0" (GND level: low level (inactive)) so as to perform communications, it is preferable that the transmission signal from the interface circuit 2 is necessarily "0" at any time other than the time of data transmission. However, damage of the interface circuit 2 or a bug in software for controlling the interface circuit 2 or a similar factor may cause the transmission signal to be "1" at a time other than the time of data transmission.

In the transmitter circuit 11 of the electronic device, when the transmission signal remains "1" for a certain time or more, the protection circuit not only stops a driving current of a light emission element but also stops the power source circuit PS1 as a reference voltage power source, so that it is possible to reduce the current consumption (Icc) of the IrDA module 1 to substantially 0. Thus, in case where the electronic device of the present embodiment is adopted particularly as a battery-driven electronic device, it is possible to prevent a time in which the device can be used from being shorter.

Conclusion of Embodiments

The infrared transmitter circuit includes: a light emission element; and a driving circuit which outputs a driving current, being constant, which causes the light emission element to emit light on the basis of a transmission signal constituted of a pulse, said driving circuit including a protection circuit for stopping supplying the driving current to the light emission element as a protection operation when the transmission signal is in a state which causes the light emission element to emit light for a certain time or more, wherein: in order to solve the foregoing problem, the driving circuit includes a reference current source for generating a reference current so as to generate the driving current, and the protection circuit stops supplying the constant driving current and stops the reference current source.

The protection circuit not only stops supplying the driving current to the light emission element but also stops the reference current source, so that a current is hardly consumed by the reference current source. Thus, it is possible to use a battery-driven device provided with the infrared transmitter circuit for a longer period of time.

It is preferable that the protection circuit begins protection operation after a time corresponding to a maximum width extending from a rising point to a falling point of a pulse causing the light emission element to emit light passes. Thus, it is possible to prevent a width of the pulse inputted as the transmission signal from being shorter.

Further, it is preferable that the protection circuit includes: a capacitor element which is charged by flow of a current; a charging control circuit for allowing a charging current to flow to the capacitor element when the transmission signal is active; a first comparison circuit for comparing a first reference voltage with an inter-terminal voltage of the capacitor element; and a retention circuit for retaining a protection operation condition of the protection circuit when the reference current source stops, and the protection circuit begins the protection operation when the first comparison circuit determines the inter-terminal voltage to be not less than the reference voltage.

As described above, the protection circuit includes the capacitor element, the charging control circuit, the first comparison circuit, and the retention circuit, so that the protection circuit operates as follows. First, when the transmission signal is active, it is possible to charge the capacitor element by means of the charging control circuit. When the inter-terminal voltage of the capacitor element rises due to the charging and reaches the first reference voltage, the first comparison circuit determines the inter-terminal voltage to be not less than the first reference voltage. Then, the protection circuit begins the protection operation so as to stop supplying the driving current to the light emission element. Further, the protection circuit stops also the reference current source, but causes the retention circuit to retain a protection operation condition of the protection circuit (a condition under which the driving current is stopped from being supplied), so that it is possible to prevent such disadvantage that: right after the reference current source stops with the light emission element emitting light when the transmission signal is active, the light emission element is driven again in response to the active transmission signal.

It is preferable that the first comparison circuit is a first inverter circuit, constituted of a P-channel field effect transistor and an N-channel field effect transistor in a complementary manner, which uses as the first reference voltage a threshold voltage in accordance with which an input is inverted so as to output thus inverted input.

The first comparison circuit is an inverter circuit (first inverter circuit), so that the number of elements (transistors) constituting the first comparison circuit is small. Therefore, use of the inverter circuit greatly reduces the number of elements compared with a first comparison circuit constituted of a comparator using a differential amplifier, so that it is possible to reduce the circuit size, and this is advantageous in integrating the infrared transmitter circuit.

It is preferable that: the protection circuit having the first inverter circuit has a resistor provided on a path through which the charging current is made to flow to the capacitor element, and the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

As described above, the protection circuit has the resistor, and the retention circuit includes the first and second switching elements, so that the protection circuit operates as follows. When the charging current flows into the capacitor element via the resistor so that the inter-terminal voltage of the capacitor element rises and exceeds the threshold voltage of the first inverter circuit, the protection circuit begins the protection operation. At this time, when the transmission signal is active, the second switching element forms the path through which the charging current is made to flow to the capacitor element, and the first switching element opens both the ends of the capacitor element, so that the capacitor element continues to be charged until its voltage reaches a voltage of the power source which supplies the charging current. Further, when the transmission signal becomes inactive, the second switching element cuts the path through which the charging current is made to flow, and the first switching element short-circuits both the ends of the capacitor element, so that the inter-terminal voltage becomes 0.

Thus, a condition under which the inter-terminal voltage exceeds the threshold voltage is kept while the transmission signal is active, so that the protection operation condition of the protection circuit is retained. Thus, compared with a retention circuit constituted of a logic circuit such as a latch, it is possible to simplify the circuit arrangement, so that this is advantageous in integrating the infrared transmitter circuit.

It is preferable that the protection circuit includes a delay stop circuit for stopping the reference current source after the protection circuit begins the protection operation. Further, it is preferable that the delay stop circuit stops the reference current source after the protection operation of the protection circuit stops supplying the driving current and the driving current completely runs out.

When the driving current is stopped from being supplied to the light emission element by causing the protection circuit to perform the protection operation, a voltage of the power source line of the driving circuit is varied by sudden variation of the driving current. Thus, when the retention circuit is constituted of a flip-flop or the like, the protection operation condition of the protection circuit that has been retained by the retention circuit is sometimes released. As to this condition, after the protection circuit begins the protection operation so as to stop supplying the driving current to the light emission element, the delay stop circuit stops the reference current source, so that it is possible to prevent the driving current from being supplied again by the release of the protection operation. Further, the delay stop circuit does not stop the reference current source while the voltage variation is being brought about by sudden variation of the driving current when the driving current is stopped from being supplied to the light emission element, and the delay stop circuit stops the reference current circuit after the driving current which alleviates the voltage variation completely runs out, so that it is possible to stop supplying the driving current to the light emission element without fail.

It is preferable that: the delay stop circuit includes a second comparison circuit for comparing a second reference voltage higher than the first reference voltage with the inter-terminal voltage of the capacitor element, and the protection circuit stops the reference current source when the second comparison circuit determines the inter-terminal voltage to be not less than the second reference voltage.

The delay stop circuit includes the second comparison circuit for comparing the second reference voltage higher than the first reference voltage with the inter-terminal voltage of the capacitor element, so that the delay stop circuit operates as follows. First, when the transmission signal is active, it is possible to charge the capacitor element by means of the charging control circuit. When the inter-terminal voltage of the capacitor element rises due to the charging and reaches the first reference voltage, the first comparison circuit determines the inter-terminal voltage to be not less than the first reference voltage. Then, the protection circuit begins the protection operation so as to stop supplying the driving current to the light emission element. When the inter-terminal voltage further rises and reaches the second reference voltage, the second comparison circuit determines the inter-terminal voltage to be not less than the second reference voltage. Then, the protection circuit stops the reference current source. Therefore, it is possible to stop the protection operation of the protection circuit and the reference current source at different timings by using a single inter-terminal voltage.

It is preferable that the second comparison circuit is a second inverter circuit, constituted of a P-channel field effect transistor and an N-channel field effect transistor in a complementary manner, which uses as the second reference voltage a threshold voltage in accordance with which an input is inverted so as to output thus inverted input.

It is preferable that the protection circuit having the second inverter circuit has a resistor provided on a path through which the charging current is made to flow to the capacitor element, and the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

The second comparison circuit is an inverter circuit (second inverter circuit), so that the number of elements (transistors) constituting the second comparison circuit is small. Therefore, use of the inverter circuit greatly reduces the number of elements compared with the second comparison circuit constituted of a comparator using a differential amplifier, so that it is possible to reduce the circuit size, and this is advantageous in integrating the infrared transmitter circuit. Here, the protection circuit has the resistor, and the retention circuit includes the first and second switching elements. Thus, as described above, a condition under which the inter-terminal voltage exceeds the threshold voltage is kept while the transmission signal is active, so that the protection operation condition of the protection circuit is retained. Thus, compared with a retention circuit constituted of a logic circuit such as a latch, it is possible to simplify the circuit arrangement, so that this is advantageous in integrating the infrared transmitter circuit.

It is preferable that an electronic device includes any one of the infrared transmitter circuits. Thus, also the reference current source stops when the protection circuit stops the driving current of the light emission element, so that it is possible to suppress the current consumption of the infrared transmitter circuit to substantially 0. Thus, it is possible to prevent a time in which a battery-driven electronic device provided with the infrared transmitter circuit can be used from being shorter.

As described above, the infrared transmitter circuit stops supplying the driving current to the light emission element and stops also the reference current source, thereby reducing the current consumption to substantially 0. Thus, this arrangement can be applied to a battery-driven mobile device required to consume less power.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An infrared transmitter circuit, comprising:
   a light emission element; and
   a driving circuit which outputs a driving current, being constant, which causes the light emission element to emit light on the basis of a transmission signal constituted of a pulse, said driving circuit including:
   (a) a protection circuit for stopping supplying the driving current to the light emission element as a protection operation when the transmission signal is in a state which causes the light emission element to emit light for a certain time or more; and
   (b) a reference current source for generating a reference current so as to generate the driving current, wherein
   the protection circuit stops supplying the driving current and stops the reference current source,
   wherein
   the protection circuit includes:
   a capacitor element which is charged by flow of a current;
   a charging control circuit for allowing a charging current to flow to the capacitor element when the transmission signal is active;
   a first comparison circuit for comparing a first reference voltage with an inter-terminal voltage of the capacitor element; and
   a retention circuit for retaining a protection operation condition of the protection circuit when the reference current source stops, and
   the protection circuit begins the protection operation when the first comparison circuit determines the inter-terminal voltage to be not less than the reference voltage.

2. The infrared transmitter circuit as set forth in claim 1, wherein the protection circuit begins protection operation after a time corresponding to a maximum width extending from a rising point to a falling point of a pulse causing the light emission element to emit light passes.

3. The infrared transmitter circuit as set forth in claim 1, wherein the first comparison circuit is a first inverter circuit, constituted of a P-channel field effect transistor and an N-channel field effect transistor in a complementary manner, which uses as the first reference voltage a threshold voltage with which an input is compared so as to invert the input and output thus inverted input.

4. The infrared transmitter circuit as set forth in claim 3, wherein:
   the protection circuit has a resistor provided on a path through which the charging current is made to flow to the capacitor element, and
   the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

5. The infrared transmitter circuit as set forth in claim 1, wherein the protection circuit includes a delay stop circuit for stopping the reference current source after the protection circuit begins the protection operation.

6. The infrared transmitter circuit as set forth in claim 5, wherein the delay stop circuit stops the reference current source after the protection operation of the protection circuit stops supplying the driving current and the driving current completely runs out.

7. The infrared transmitter circuit as set forth in claim 5, wherein:
   the delay stop circuit includes a second comparison circuit for comparing a second reference voltage higher than the first reference voltage with the inter-terminal voltage of the capacitor element, and
   the protection circuit stops the reference current source when the second comparison circuit determines the inter-terminal voltage to be not less than the second reference voltage.

8. The infrared transmitter circuit as set forth in claim 7, wherein the second comparison circuit is a second inverter circuit, constituted of a P-channel field effect transistor and an N-channel field effect transistor in a complementary manner, which uses as the second reference voltage a threshold voltage with which an input is compared so as to invert the input and output thus inverted input.

9. The infrared transmitter circuit as set forth in claim 8, wherein:
   the protection circuit has a resistor provided on a path through which the charging current is made to flow to the capacitor element, and
   the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

10. An electronic device, comprising an infrared transmitter circuit which includes:
a light emission element; and
a driving circuit which outputs a driving current, being constant, which causes the light emission element to emit light on the basis of a transmission signal constituted of a pulse, said driving circuit including:
(a) a protection circuit for stopping supplying the driving current to the light emission element as a protection operation when the transmission signal is in a state which causes the light emission element to emit light for a certain time or more; and
(b) a reference current source for generating a reference current so as to generate the driving current, wherein
the protection circuit stops supplying the driving current and stops the reference current source,
wherein
the protection circuit includes:
a capacitor element which is charged by flow of a current;
a charging control circuit for allowing a charging current to flow to the capacitor element when the transmission signal is active;
a first comparison circuit for comparing a first reference voltage with an inter-terminal voltage of the capacitor element; and
a retention circuit for retaining a protection operation condition of the protection circuit when the reference current source stops, and
the protection circuit begins the protection operation when the first comparison circuit determines the inter-terminal voltage to be not less than the reference voltage.

11. The electronic device as set forth in claim 10, wherein the protection circuit begins protection operation after a time corresponding to a maximum width extending from a rising point to a falling point of a pulse causing the light emission element to emit light passes.

12. The electronic device as set forth in claim 10, wherein the first comparison circuit is a first inverter circuit, constituted of a P-channel field effect transistor and an N-channel field effect transistor in a complementary manner, which uses as the first reference voltage a threshold voltage with which an input is compared so as to invert the input and output thus inverted input.

13. The electronic device as set forth in claim 12, wherein:
the protection circuit has a resistor provided on a path through which the charging current is made to flow to the capacitor element, and
the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

14. The electrode device as set forth in claim 10, wherein the protection circuit includes a delay stop circuit for stopping the reference current source after the protection circuit begins the protection operation.

15. The electronic device as set forth in claim 14, wherein the delay stop circuit stops the reference current source after the protection operation of the protection circuit stops supplying the driving current and the driving current completely runs out.

16. The electronic device as set forth in claim 14, wherein:
the delay stop circuit includes a second comparison circuit for comparing a second reference voltage higher than the first reference voltage with the inter-terminal voltage of the capacitor element, and
the protection circuit stops the reference current source when the second comparison circuit determines the inter-terminal voltage to be not less than the second reference voltage.

17. The electronic device as set forth in claim 16, wherein the second comparison circuit is a second inverter circuit, constituted of a P-channel field effect transistor and an N-channel field effect transistor in a complementary manner, which uses as the second reference voltage a threshold voltage with which an input is compared so as to invert the input and output thus inverted input.

18. The electronic device as set forth in claim 17, wherein:
the protection circuit has a resistor provided on a path through which the charging current is made to flow to the capacitor element, and
the retention circuit includes: a first switching element which opens both ends of the capacitor element when the transmission signal is active and short-circuits both the ends of the capacitor element when the transmission signal is inactive; and a second switching element which forms a path through which the charging current is made to flow to the capacitor element when the transmission signal is active and cuts the path through which the charging current is made to flow to the capacitor element when the transmission signal is inactive.

* * * * *